United States Patent
Tizhoosh et al.

(10) Patent No.: US 12,488,603 B2
(45) Date of Patent: Dec. 2, 2025

(54) SYSTEMS AND METHODS FOR AUTOMATICALLY IDENTIFYING FEATURES OF A CYTOLOGY SPECIMEN

(71) Applicants: Hamid Reza Tizhoosh, Rochester, MN (US); Clinton James Vaughan Campbell, Oakville (CA)

(72) Inventors: Hamid Reza Tizhoosh, Waterloo (CA); Seyed Rohollah Moosavitayebi, Oshawa (CA); Clinton James Vaughan Campbell, Oakville (CA)

(73) Assignees: HAMID REZA TIZHOOSH, Rochester, MN (US); CLINTON JAMES VAUGHAN CAMPBELL, Oakville (CA)

(*) Notice: Subject to any disclaimer, the term of this patent is extended or adjusted under 35 U.S.C. 154(b) by 605 days.

(21) Appl. No.: 17/720,678

(22) Filed: Apr. 14, 2022

(65) Prior Publication Data
US 2022/0335736 A1    Oct. 20, 2022

Related U.S. Application Data

(60) Provisional application No. 63/175,819, filed on Apr. 16, 2021.

(51) Int. Cl.
    *G06K 9/00*      (2022.01)
    *G06T 7/00*      (2017.01)
    (Continued)

(52) U.S. Cl.
    CPC ............ *G06V 20/69* (2022.01); *G06T 7/0012* (2013.01); *G06V 10/25* (2022.01); *G06V 10/761* (2022.01);
    (Continued)

(58) Field of Classification Search
    CPC .................. G06V 20/69; G06V 10/25; G06T 2207/20084; G06T 2207/30024
    See application file for complete search history.

(56) References Cited

U.S. PATENT DOCUMENTS

2022/0108123 A1*    4/2022    Bhargava ................. G06T 7/11

OTHER PUBLICATIONS

Gupta, M., Das, C., Roy, A., Gupta, P., Pillai, G. R., & Patole, K. (2020, April). Region of interest identification for cervical cancer images. In 2020 IEEE 17th International Symposium on Biomedical Imaging (ISBI) (pp. 1293-1296). IEEE. (Year: 2020).*

(Continued)

*Primary Examiner* — Molly Wilburn
*Assistant Examiner* — Aidan Keup
(74) *Attorney, Agent, or Firm* — WOMBLE BOND DICKINSON (US) LLP

(57) ABSTRACT

Computer-implemented methods and systems are provided for automatically identifying features of a cytology specimen. An example method can involve dividing a whole slide image of the cytology specimen into a plurality of image portions; applying a first neural network to each image portion to identify one or more relevant image portions; and applying a second neural network to a first relevant image portion and a second relevant image portion to generate a respective first and second cell data. Each relevant image portion can be an image portion containing a region of interest for the cytology specimen. The method can further involve comparing the first and second cell data to determine whether a similarity threshold is satisfied; and in response to determining the similarity threshold is not satisfied, continuing to apply the second neural network to a subsequent relevant image portion until the similarity threshold is satisfied.

22 Claims, 21 Drawing Sheets
(16 of 21 Drawing Sheet(s) Filed in Color)

(51) Int. Cl.
  *G06V 10/25* (2022.01)
  *G06V 10/74* (2022.01)
  *G06V 10/82* (2022.01)
  *G06V 20/69* (2022.01)
(52) U.S. Cl.
  CPC .... *G06V 10/82* (2022.01); *G06T 2207/20084* (2013.01); *G06T 2207/30024* (2013.01)

(56) References Cited

OTHER PUBLICATIONS

Golden, J. A. Deep Learning Algorithms for Detection of Lymph Node Metastases From Breast Cancer. Jama 318:22, 2184-2186 (2017).
Bejnordi, B. E. et al. Diagnostic Assessment of Deep Learning Algorithms for Detection of Lymph Node Metastases in Women With Breast Cancer. Jama 318:22, 2199-2210 (2017).
McKinney, S. M. et al. International evaluation of an AI system for breast cancer screening. Nature 577, 89-94 (2020).
Xu, Y. et al. Large scale tissue histopathology image classification, segmentation, and visualization via deep convolutional activation features. BMC Bioinformatics (2017) 18:281.
Sirinukunwattana, K. et al. Gland segmentation in colon histology images: The glas challenge contest. Med Image Anal 35, 489-502 (2017).
Korbar, B. et al. Deep learning for classification of colorectal polyps on whole-slide images. J Pathology Informatics 1:30 (2017).
Esteva, A. et al. Dermatologist-level classification of skin cancer with deep neural networks. Nature 542(7639), 115-118 (2017).
Bulten, W. et al. Unsupervised Prostate Cancer Detection on H&E using Convolutional Adversarial Autoencoders. Arxiv (2018).
Nguyen, A. N. et al. Symbolic rule-based classification of lung cancer stages from free-text pathology reports. Journal of the American Medical Informatics Association 17:440-445, (2010).
Faust, K. et al. Intelligent feature engineering and ontological mapping of brain tumour histomorphologies by deep learning. Nat Mach Intell 1, 316-321 (2019).
Barker, J. et al. Automated classification of brain tumor type in whole-slide digital pathology images using local representative tiles. Medical Image Analysis 30, 60-71 (2016).
Nagpal, K. et al. Development and validation of a deep learning algorithm for improving Gleason scoring of prostate cancer. Npj Digital Medicine 2:48 (2019).
Masmoudi, M. et al. Object Detection Learning Techniques for Autonomous Vehicle Applications. 2019 IEEE Int Conf Veh Electron Saf (ICVES) 00, 1-5 (2019).
Masita, K. L. et al. Deep Learning in Object Detection: a Review. 2020 Int Conf Artif Intell Big Data Comput Data Commun Syst Icabcd 00, 1-11 (2020).
Girshick, R. et al. Rich feature hierarchies for accurate object detection and semantic segmentation. Arxiv (2013).
Ren, S. et al. Faster R-CNN: Towards Real-Time Object Detection with Region Proposal Networks. Arxiv (2015).
Redmon, J. et al. You Only Look Once: Unified, Real-Time Object Detection. 2016 IEEE Conf Comput Vis Pattern Recognit Cvpr 779-788 (2016).
C, D. H. et al. An Overview of You Only Look Once: Unified, Real-Time Object Detection. Int J Res Appl Sci Eng Technology (IJRASET) 8:VI, 607-609 (2020).
Bochkovskiy, A. et al. YOLOv4: Optimal Speed and Accuracy of Object Detection. Arxiv (2020).
Laroca, R. et al. A Robust Real-Time Automatic License Plate Recognition Based on the YOLO Detector. 2018 Int Jt Conf Neural Networks Ijcnn 00, 1-10 (2018).
Ren, P. et al. A Novel YOLO-Based Real-Time People Counting Approach. 2017 Int Smart Cities Conf Isc2 1-2 (2017).
Wang. C-Y. et al. CSPNet: A new backbone that can enhance learning capability of CNN. Proceedings of the IEEE Conference on Computer Vision and Pattern Recognition Workshop (CVPR Workshop), 2020.
He, K. et al. Spatial pyramid pooling in deep convolutional networks for visual recognition. IEEE Transactions on Pattern Analysis and Machine Intelligence (TPAMI), 37(9):1904-1916. 2015.
Liu, S. et al. Path aggregation network for instance segmentation. In Proceedings of the IEEE Conference on Computer Vision and Pattern Recognition (CVPR), pp. 8759-8768, 2018.
Redmon, J. et al. YOLOv3: An incremental improvement. arXiv preprint arXiv:1804.02767, 2018.
Zheng, Z. et al. Distance-loU Loss: Faster and better learning for bounding box regression. In Proceedings of the AAAI Conference on Artificial Intelligence (AAAI-20), 2020.
Misra, D. Mish: A self regularized non-monotonic neural activation function. arXiv preprint arXiv:1908.08681, 2019.
Ghiasi, G. et al. DropBlock: A regularization method for convolutional networks. In Advances in Neural Information Processing Systems (NIPS), pp. 10727-10737, 2018.
Loshchilov, I. et al. SGDR: Stochastic gradient descent with warm restarts. arXiv preprint arXiv:1608.03983, 2016.
Yun, S. et al. CutMix: Regularization strategy to train strong classifiers with localizable features. In Proceedings of the IEEE International Conference on Computer Vision (ICCV), pp. 6023-6032, 2019.
Huang, G. et al. Densely connected convolutional networks. In Proceedings of the IEEE Conference on Computer Vision and Pattern Recognition (CVPR), pp. 4700-4708, 2017.
Everingham, M. et al. "The PASCAL Visual Object Classes (VOC) Challenge," Int'l J. Computer Vision, vol. 88, No. 2, pp. 303-338, Jun. 2010.
Liu, H. et al. Bone Marrow Cells Detection: A Technique for the Microscopic Image Analysis. J Med Syst 43:82 (2019).
Choi, J. W. et al. White blood cell differential count of maturation stages in bone marrow smear using dual-stage convolutional neural networks. PloS One. 12(12):e0189259 (2017).
Challen, R. et al. Artificial intelligence, bias and clinical safety. BMJ Qual Saf 28, 231 (2019).
Lee, S. et al. ICSH guidelines for the standardization of bone marrow specimens and reports. Int J Lab Hematol 30, 349 364 (2008).
Bain, B. J. Bone marrow trephine biopsy. Journal of clinical pathology 54, 737 742 (2001).
Bain, B. J. Bone marrow aspiration. Journal of clinical pathology 54, 657 663 (2001),.
Ridgeway, J. A. et al. Practical Guide to Bone Marrow Sampling for Suspected Myelodysplastic Syndromes. Journal of the Advanced Practitioner in Oncology 8, (2017).
Bain, B. J. The bone marrow aspirate of healthy subjects. Brit J Haematol 94, 206-209 (1996).
Abdulrahman, A. A. et al. Is a 500-Cell Count Necessary for Bone Marrow Differentials? American Journal of Clinical Pathology 150, (2018).
Arber, D. A. et al. Initial Diagnostic Workup of Acute Leukemia: Guideline From the College of American Pathologists and the American Society of Hematology. Arch Pathol Lab Med (2017).
Döhner, H. et al. Diagnosis and management of AML in adults: 2017 ELN recommendations from an international expert panel. Blood 129, 424 447 (2017).
Montalban-Bravo, G. et al. Myelodysplastic syndromes: 2018 update on diagnosis, risk-stratification and management. Am J Hematol 93, 129 147 (2018).
Sasada, K. et al. Inter-observer variance and the need for standardization in the morphological classification of myelodysplastic syndrome. Leukemia Res 69, 54 59 (2018).
Font, P. et al. Interobserver variance in myelodysplastic syndromes with less than 5% bone marrow blasts: unilineage vs. multilineage dysplasia and reproducibility of the threshold of 2 % blasts. Ann Hematol 94, 565-573 (2015).
Porta, D. M. et al. Minimal morphological criteria for defining bone marrow dysplasia: a basis for clinical implementation of WHO classification of myelodysplastic syndromes. Leukemia 29, 66 (2015).

(56) References Cited

OTHER PUBLICATIONS

Goasguen, J. E. et al. Proposal for refining the definition of dysgranulopoiesis in acute myeloid leukemia and myelodysplastic syndromes, Leukemia Res 38, 447-453 (2014).
Font, P. et al. Inter-observer variance with the diagnosis of myelodysplastic syndromes (MDS) following the 2008 WHO classification. Ann Hematol 92, 19-24 (2013).
Senent, L. et al. Reproducibility of the World Health Organization 2008 criteria for myelodysplastic syndromes. Haematologica 98, 568-575 (2013).
Parmentier, S. et al. Assessment of dysplastic hematopoiesis: lessons from healthy bone marrow donors. Haematologica 97, 723-730 (2012).
Naqvi, K. et al. Implications of discrepancy in morphologie diagnosis of myelodysplastic syndrome between referral and tertiary care centers. Blood 118, 4690-4693 (2011).
Chang, H. et al. Artificial Intelligence in Pathology. J Pathology Transl Medicine 53, 1-12 (2018).
Lecun, Y. et al. Deep learning. Nature 521, 436 (2015).
Russakovsky, O. et al. ImageNet Large Scale Visual Recognition Challenge. Int J Comput Vision 115, 211-252 (2015).
Tizhoosh, H. et al. Artificial intelligence and digital pathology: Challenges and opportunities. J Pathology Informatics 9, 38 (2018).
Djuric, U. et al. Precision histology: how deep learning is poised to revitalize histomorphology for personalized cancer care. Npj Precis Oncol 1, 22 (2017).
Janowczyk, A. et al., A. Deep learning for digital pathology image analysis: A comprehensive tutorial with selected use cases. J Pathology Informatics 7, 29 (2016).
Kutlu, H. et al. White blood cells detection and classification based on regional convolutional neural networks. Med Hypotheses 135 (2020) 109472.
Hegde, R. B. et al. Development of a Robust Algorithm for Detection of Nuclei and Classification of White Blood Cells in Peripheral Blood Smear Images. J Med Syst 2018;42(6):110.
Neelam, S. et al. Automation of differential blood count. Proc. IEEE Conference on Convergent Technologies for the Asia-Pacific Region, Bangalore, India, Oct. 15-17, 2003, 2, 547-551.
Nisha, R. et al. Isolation and two-step classification of normal white blood cells in peripheral blood smears. J Pathol Informatics 2012;3:13.
Arslan, S. et al. A color and shape based algorithm for segmentation of white blood cells in peripheral blood and bone marrow images. Cytometry Part A;85:480-90 (2014).
Madhloom, H. T. et al. An image processing application for the localization and segmentation of lymphoblast cell using peripheral blood images. J Med Syst (2012) 36:2149-2158.
Hiremath, P. S. et al. Automated identification and classification of white blood cells (leukocytes) in digital microscopic images. Int J Comput Appl, Special Issue RTIPPR (2010) 59-63.
Sawsan, F.B. et al. Segmentation and classification of white blood cells. Proc IEEE Int Conf Acoust Speech Signal Process (2000) 2259-2261.
Nazlibilek, S. et al. Automatic segmentation, counting, size determination and classification of white blood cells. Measurement 55 (2014) 58-65.
Rezatofighi, S. H. et al. Automatic recognition of five types of white blood cells in peripheral blood. Comput Med Imaging Graph 35 (2011) 333-43.
Mathur, A. et al. Scalable system for classification of white blood cells from Leishman stained blood stain images. J. Pathol. Informatics 2013; 4:S15.
Chandradevan, R. et al. Machine-based detection and classification for bone marrow aspirate differential counts: initial development focusing on nonneoplastic cells. Lab Investig. Jan. 2020; 100(1):98-109.
Tôtu, B. et al. Canadian Licensure for the Use of Digital Pathology for Routine Diagnoses: One More Step Toward a New Era of Pathology Practice Without Borders. Archives Pathology Amp Laboratory Medicine 138, 302-304 (2013).
Pantanowitz, L. et al. American Telemedicine Association clinical guidelines for telepathology. J Pathology Informatics 2014;5:39.
Hanna, M. G. et al. Overview of contemporary guidelines in digital pathology: what is available in 2015 and what still needs to be addressed? J Clin Pathol 68, 499 (2015).
Pantanowitz, L. et al. Validating whole slide imaging for diagnostic purposes in pathology: guideline from the College of American Pathologists Pathology and Laboratory Quality Center, Arch Pathol Lab Med 137, 1710-22 (2013).
Bauer, T. W. et al. Validation of Whole Slide Imaging for Primary Diagnosis in Surgical Pathology. Arch Pathol Lab Med 137, 518-524 (2013).
Steensma, D. P. Myelodysplastic syndromes current treatment algorithm 2018. Blood Cancer J (2018) 8:47.
Maassen, A. et al. Validation and proposals for a refinement of the WHO 2008 classification of myelodysplastic syndromes without excess of blasts. Leukemia Res 37, 64-70 (2013).
Ravandi, F. et al. Evaluating measurable residual disease in acute myeloid leukemia. Blood Adv 2, 1356-1366 (2018).
Grimwade, D. et al. Defining minimal residual disease in acute myeloid leukemia: which platforms are ready for "prime time"? Blood 124, 3345-3355 (2014).
Radakovich, N. et al. Artificial Intelligence in Hematology: Current Challenges and Opportunities. Curr Hematol Malig Reports (2020) 15:203-210.
Jordan, M. I. et al. Machine learning: Trends, perspectives, and prospects. Science 349, 255-260 (2015).
Niazi, M. K. K., et al. Digital pathology and artificial intelligence. Lancet Oncol 20, e253-e261 (2019).
Araújo, T. et al. Classification of breast cancer histology images using Convolutional Neural Networks. Plos One 12(6), e0177544 (2017).
Dong, F. et al. Computational Pathology to Discriminate Benign from Malignant Intraductal Proliferations of the Breast. Plos One 9(12), e114885 (2014).

* cited by examiner

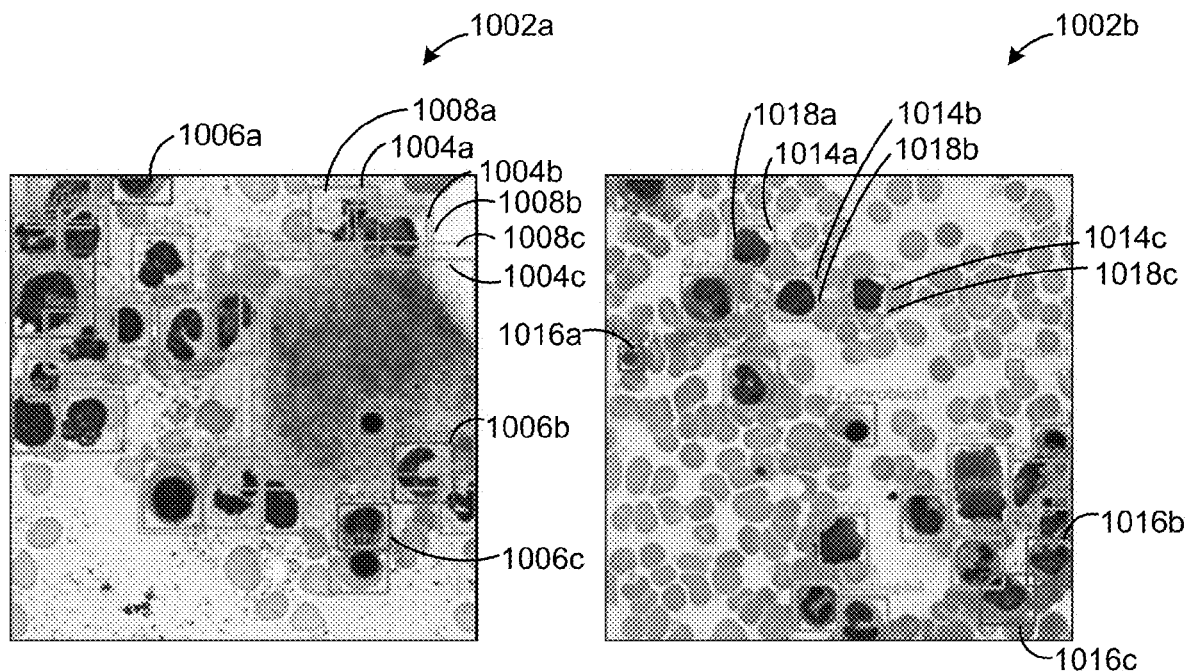
FIG. 10A  FIG. 10B
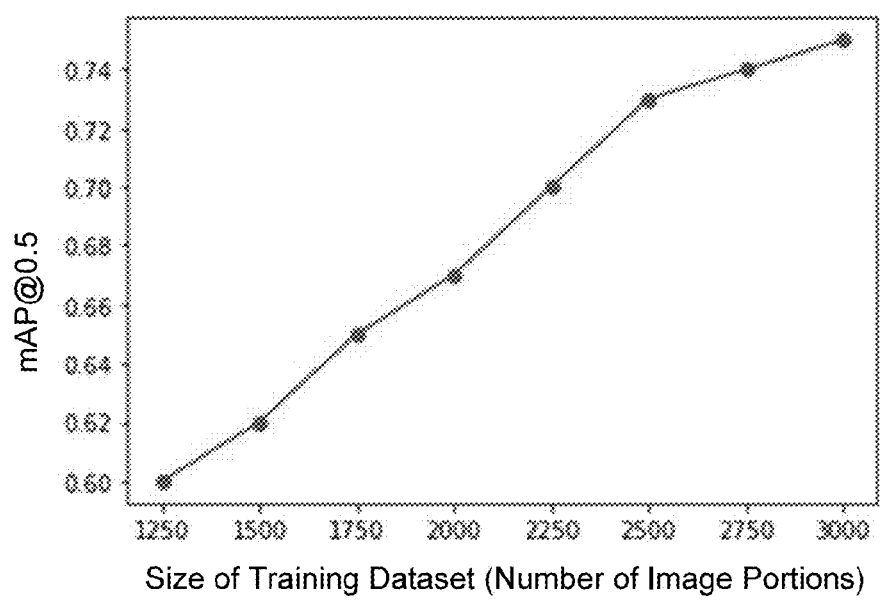
FIG. 11

SYSTEMS AND METHODS FOR AUTOMATICALLY IDENTIFYING FEATURES OF A CYTOLOGY SPECIMEN

RELATED PATENT APPLICATION

This application claims the benefit of U.S. provisional application No. 63/175,819 filed on Apr. 16, 2021 entitled "Systems and Methods for Automatically Classifying Cell Types in Medical Images". The entirety of U.S. provisional application No. 63/175,819 is hereby incorporated by reference.

FIELD

The described embodiments relate to systems and methods for automatically identifying features in medical image data. In some embodiments, the system and methods relate to automatically identifying features of a cytology specimen.

BACKGROUND

Hematopathologists perform bone marrow studies by analyzing a liquid cytology specimen (an aspirate), a solid tissue histopathology specimen (e.g., a trephine core biopsy), a peripheral blood film and/or karyotype. The studies may involve flow cytometry and/or molecular tests. Depending on the diagnosis, the turnaround time on such bone marrow studies can range from days to weeks. Analysis of the aspirate and the blood film involve a manual count of cells, which can be subject to variation between observers. Since a wrong or delayed diagnosis would delay possibly life-saving patient treatment, improved solutions in the diagnostic process are desirable.

SUMMARY

The various embodiments described herein generally relate to methods (and associated systems configured to implement the methods) for automatically identifying features of a cytology specimen.

An example method can involve dividing a whole slide image of the cytology specimen into a plurality of image portions; applying a first neural network to each image portion of the plurality of image portions to identify one or more relevant image portions from the plurality of image portions; selecting a base set of relevant image portions from the one or more relevant image portions; and applying a second neural network to the base set of relevant image portions to generate a base cell data for the base set of relevant image portions. Each relevant image portion can be an image portion containing a region of interest for the cytology specimen. The base cell data can include a predicted feature type and an accuracy likelihood for the predicted feature type for each relevant image portion of the base set of relevant image portions. The method can further involve applying the second neural network to a relevant image portion outside the base set of relevant image portions to generate a supplemental cell data; comparing the supplemental cell data with the base cell data to determine whether a similarity threshold is satisfied; and in response to determining the similarity threshold is not satisfied, continuing to apply the second neural network to a subsequent relevant image portion of the one or more relevant image portions until the similarity threshold is satisfied.

In some embodiments, comparing the supplemental cell data with the base cell data to determine whether the similarity threshold is satisfied can involve applying a statistical model to the supplemental cell data and the base cell data to determine whether the similarity threshold is satisfied.

In some embodiments, applying the statistical model can involve determining a chi-square distance between the supplemental cell data and the base cell data.

In some embodiments, the method can further involve, in response to determining the similarity threshold is not satisfied, updating the base cell data to include the supplemental cell data.

In some embodiments, the method can further involve generating a histogram to represent each cell data.

In some embodiments, the predicted feature type can include a predicted cell type.

In some embodiments, the predicted feature type can include a predicted non-cellular type.

In some embodiments, the first neural network can be trained to identify the regions of interest suitable for identifying features of the cytology specimen.

In some embodiments, the second neural network can be trained to detect and identify the features within the cytology specimen.

In another broad aspect, a system for automatically identifying features of a cytology specimen is disclosed herein. The system can include a processor operable to divide a whole slide image of the cytology specimen into a plurality of image portions; apply a first neural network to each image portion of the plurality of image portions to identify one or more relevant image portions from the plurality of image portions; select a base set of relevant image portions from the one or more relevant image portions; and apply a second neural network to the base set of relevant image portions to generate a base cell data for the base set of relevant image portions. Each relevant image portion can be an image portion containing a region of interest for the cytology specimen. The base cell data can include a predicted feature type and an accuracy likelihood for the predicted feature type for each relevant image portion of the base set of relevant image portions. The processor can be further operable to apply the second neural network to a relevant image portion outside the base set of relevant image portions to generate a supplemental cell data; compare the supplemental cell data with the base cell data to determine whether a similarity threshold is satisfied; and in response to determining the similarity threshold is not satisfied, continue to apply the second neural network to a subsequent relevant image portion of the one or more relevant image portions until the similarity threshold is satisfied.

In some embodiments, the processor can apply a statistical model to the supplemental cell data and the base cell data to determine whether the similarity threshold is satisfied.

In some embodiments, the processor can determine a chi-square distance between the supplemental cell data and the base cell data.

In some embodiments, the processor can, in response to determining the similarity threshold is not satisfied, update the base cell data to include the supplemental cell data.

In some embodiments, the processor can generate a histogram to represent each cell data.

In some embodiments, the predicted feature type can include a predicted cell type and/or a predicted non-cellular type.

In some embodiments, the first neural network can be trained to identify the regions of interest suitable for identifying features of the cytology specimen. In some embodiments, the second neural network can be trained to detect and identify the features within the cytology specimen.

In another broad aspect, a method of automatically identifying features of a cytology specimen is disclosed. The method can involve dividing a whole slide image of the cytology specimen into a plurality of image portions; applying a first neural network to each image portion of the plurality of image portions to identify one or more relevant image portions from the plurality of image portions; and applying a second neural network to a first relevant image portion and a second relevant image portion to generate a respective first and second cell data. Each relevant image portion can be an image portion containing a region of interest for the cytology specimen. Each of the first and second cell data can include a predicted feature type and an accuracy likelihood for the predicted feature type. The method can further involve comparing the first cell data with the second cell data to determine whether a similarity threshold is satisfied; and in response to determining the similarity threshold is not satisfied, continuing to apply the second neural network to a subsequent relevant image portion of the one or more relevant image portions until the similarity threshold is satisfied.

In some embodiments, comparing the first cell data with the second cell data to determine whether the similarity threshold is satisfied can involve applying a statistical model to the first cell data and the second cell data to determine whether the similarity threshold is satisfied.

In some embodiments, applying the statistical model can involve determining a chi-square distance between the first cell data and the second cell data.

In some embodiments, the method can further involve: combining the first cell data with the second cell data to generate a base cell data; applying the second neural network to a third relevant image portion to generate a third cell data; comparing the third cell data with the base cell data to determine whether the similarity threshold is satisfied; and in response to determining the similarity threshold is not satisfied, combining the third cell data with the base cell data and continuing to apply the second neural network to the subsequent relevant image portion of the one or more relevant image portions until the similarity threshold is satisfied, otherwise, the base cell data represents the features of the cytology specimen.

In another broad aspect, a system for automatically identifying features of a cytology specimen is disclosed. The system can include a processor operable to divide a whole slide image of the cytology specimen into a plurality of image portions; apply a first neural network to each image portion of the plurality of image portions to identify one or more relevant image portions from the plurality of image portions; and apply a second neural network to a first relevant image portion and a second relevant image portion to generate a respective first and second cell data. Each relevant image portion can be an image portion containing a region of interest for the cytology specimen. Each of the first and second cell data can include a predicted feature type and an accuracy likelihood for the predicted feature type. The processor can be further operable to compare the first cell data with the second cell data to determine whether a similarity threshold is satisfied; and in response to determining the similarity threshold is not satisfied, continue to apply the second neural network to a subsequent relevant image portion of the one or more relevant image portions until the similarity threshold is satisfied.

In some embodiments, the processor can apply a statistical model to the first cell data and the second cell data to determine whether the similarity threshold is satisfied.

In some embodiments, the processor can determine a chi-square distance between the first cell data and the second cell data.

In some embodiments, the processor can: combine the first cell data with the second cell data to generate a base cell data; apply the second neural network to a third relevant image portion to generate a third cell data; compare the third cell data with the base cell data to determine whether the similarity threshold is satisfied; and in response to determining the similarity threshold is not satisfied, combine the third cell data with the base cell data and continue to apply the second neural network to the subsequent relevant image portion of the one or more relevant image portions until the similarity threshold is satisfied, otherwise, the base cell data represents the features of the cytology specimen.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Several embodiments will now be described in detail with reference to the drawings, in which:

FIG. 10A shows an example image portion annotated with a comparison of predicted features and actual features;

FIG. 10B shows another example image portion annotated with a comparison of predicted features and actual features;

FIG. 11 is a graphical illustration of a performance of an example neural network trained for predicting features in accordance with the methods and systems disclosed herein;

Figure 1:
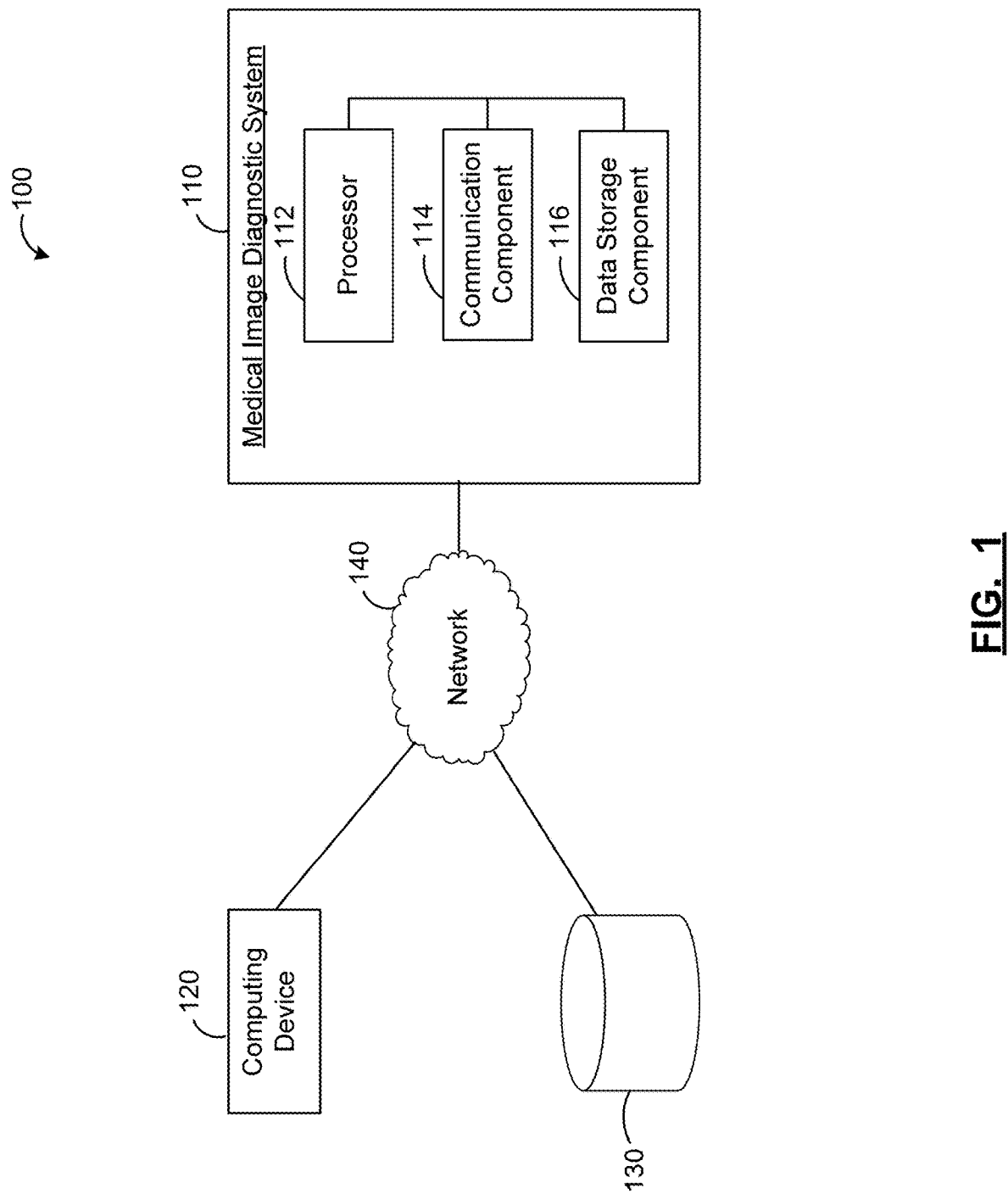
FIG. 1 is a block diagram of components interacting with a medical image diagnostic system, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

A bone marrow study is the foundation of a hematological diagnosis. A bone marrow study is performed to investigate a clinically suspected hematological disorder, as part of lymphoma staging protocols, and to assess bone marrow response to chemotherapy in acute leukemias. Information is extracted by a hematopathologist from the multiple components that comprise a bone marrow study and then integrated with clinical information to make a final diagnostic interpretation. Much of this interpretation can rely on visual features from bone marrow cells and tissue viewed through a light microscope or more recently, via high-resolution scanned digital whole slide image (DWSI) of pathology specimens, known as digital pathology.

One component of a bone marrow study, called the aspirate, consists of particles of bone marrow tissue that are smeared onto a glass slide to allow individual bone marrow cells to be analyzed for subtle and complex cellular features (cytology). In accordance with international standards, aspirate cytology includes a nucleated differential cell count (NDC), where 300 to 500 individual bone marrow cells are manually identified, counted, and classified into one of many discrete categories by a highly experienced operator such as a hematopathologist. Such manual identification, counting, and classification can be tedious.

Bone marrow cytology and the NDC are used for many critical diagnostic and clinical decision points in hematology. For example, the identification of leukemic blasts may lead to immediate initiation of flow cytometry, karyotype, and induction chemotherapy in acute myeloid leukemia (AML). Similarly, the identification of subtle cytological changes in bone marrow cells called myelodysplasia leads to the diagnosis and appropriate risk stratification of myelodysplastic syndromes (MDS), which can be a difficult-to-diagnose cancer. Failure to recognize and quantify abnormal cell populations in the aspirate in a timely and accurate manner may lead to delayed or incorrect diagnosis.

In the context of a reference hematopathology lab, performing cytological review on every bone marrow aspirate specimen is tedious and subject to high inter-observer variation. At the same time, smaller community centres often lack sufficient technical expertise to correctly interpret bone marrow aspirate cytology. One study estimated that up to 12% of myelodysplastic syndromes (MDS) cases are misdiagnosed due to the inability to recognize morphological dysplasia in aspirate specimens.

Some systems have implemented artificial intelligence, including machine learning, such as deep convolutional neural networks (CNN), to perform digital image analysis and image classification tasks that support hematopathology and aspirate review. However, the vast majority of such systems perform morphological analysis at the level of cellular resolution and represents non-binary classification based on subtle morphological features such as dysplasia in MDS. Furthermore, bone marrow aspirates are complex cytological specimens that contain only a small number of regions suitable for cytology. As well, bone marrow aspirates contain significant non-cellular debris and many different cell types that are often overlapping.

In terms of machine learning, aspirate cytology can generally be modelled into three distinct computational problems. The first problem can relate to region-of-interest (ROI) detection, where relatively small regions are suitable for cytology are selected from a large digital whole slide image prior to cell detection and classification. Selecting a regionof-interest is typically performed by a human operator manually detecting and cropping regions within aspirate digital whole slide images.

The second problem can relate to object detection, where individual bone marrow cells or non-cellular objects are identified in an aspirate digital whole slide image as both distinct and separate from the background. Previous approaches have employed deep learning algorithms for object detection such as regional CNN (R-CNN), fast and faster R-CNN. These approaches utilize region proposals for object detection followed by a separate method such as a classifier for object classification, which can render them to be complex to train and computationally inefficient.

The third problem can relate to object classification, where individual bone marrow cells or non-cellular objects are assigned to one of numerous discrete classes based on nuances and complex cytological features. This complexity increases in MDS, where morphological dysplasia creates subtle cytological changes. One approach to address this problem involves using a VGG16 convolutional network. However, this approach can be operationally slow and is not likely scalable to a clinical diagnostic workflow.

There have been limited studies in automating bone marrow cytology. One proposed method for automatic cell classification in blood or bone marrow differential cell count included a dataset that had a small number of cells (i.e., 2,174 cells) from a limited number of classes (i.e., 10 classes) and did not include other important cell types. In addition, that proposed method focused on classification and did not address cell detection. As such, that proposed method involved manually selecting a region-of-interest and manually cropping the whole slide image. Another approach directed to bone marrow aspirate differential cell counts involves using two-stage cell detection and classification separately. However, this approach is operationally slow and is only able to detect and classify 11 cell types. Again, another drawback of this approach is that the ROI detection in tiles is manually performed.

The systems and methods for bone marrow aspirate cytology are disclosed herein. The systems and methods disclosed can be automated end-to-end, which can lead to more cost-effective, efficient, and accurate diagnosis and can allow for precision medicine in hematology.

Reference is now made to FIG. 1, which illustrates a block diagram 100 of components interacting with a medical image diagnostic system 110. As shown in FIG. 1, the medical image diagnostic system 110 is in communication with a computing device 120 and an external data storage 130 via a network 140.

The medical image diagnostic system 110 includes a processor 112, a communication component 114, and a data storage component 116. The medical image diagnostic system 110 can be provided on one or more computer servers that may be distributed over a wide geographic area and connected via the network 140.

The processor 112, the communication component 114, and the data storage component 116 can be combined into a fewer number of components or can be separated into further components. In some cases, one or more of the components may be distributed over a wide geographic area. The processor 112, the communication component 114, and the data storage component 116 may be implemented in software or hardware, or a combination of software and hardware.

The processor 112 can operate to control the operation of the medical image diagnostic system 110. The processor 112 can initiate and manage the operations of each of the other components within the medical image diagnostic system 110. The processor 112 may be any suitable processors, controllers or digital signal processors, graphics processing unit, application specific integrated circuits (ASICs), and/or field programmable gate arrays (FPGAs) that can provide sufficient processing power depending on the configuration, purposes and requirements of the medical image diagnostic system 110. In some embodiments, the processor 112 can include more than one processor with each processor being configured to perform different dedicated tasks. The processor 112 can execute various instructions stored in the data storage 116 to implement the various methods described herein.

The communication component 114 may include any interface that enables the medical image diagnostic system 110 to communicate with other devices and systems. In some embodiments, the communication component 114 can include at least one of a serial port, a parallel port or a USB port. The communication component 114 may also include an interface to a component via one or more of a Bluetooth®, WiFi, Internet, Local Area Network (LAN), Ethernet, Firewire, modem, fiber, or digital subscriber line connection. Various combinations of these elements may be incorporated within the communication component 114. The communication component 114 can be used to communicate with the computing device 120, for example, to receive digital whole slide images (DWSI) or portions thereof.

For example, the communication component 114 may receive input from various input devices, such as a mouse, a keyboard, a touch screen, a thumbwheel, a track-pad, a track-ball, a card-reader, voice recognition software and the like depending on the requirements and implementation of the medical image diagnostic system 110.

The data storage component 116 can include RAM, ROM, one or more hard drives, one or more flash drives or some other suitable data storage elements such as disk drives, etc. The data storage component 116 can include one or more databases for storing information relating to the images, patient information, diagnostic information, etc. The data storage 116 can also store data used to train neural networks, such as but not limited to DWSI or portions thereof and image annotations, such as but not limited to relevant image portions, image portions not identified as relevant, cellular features, and non-cellular features. The data storage 116 can also store instructions that can be executed by the processor 112 to implement the various methods described herein.

Similar to the data storage component 116, the external data storage 130 can also include RAM, ROM, one or more hard drives, one or more flash drives or some other suitable data storage elements such as disk drives, etc. In some embodiments, the external data storage 130 can be similar to the data storage 116 but located remotely from the medical image diagnostic system 110 and accessible via the network 140. The external data storage 130 can include one or more databases for storing information relating to the images, patient information, diagnostic information, etc. Furthermore, the external data storage 130 can also store data used to train neural networks, such as but not limited to DWSI or portions thereof and image annotations, such as but not limited to relevant image portions, image portions not identified as relevant, cellular features, and non-cellular features. The external data storage 130 can store various data associated with the operation of the medical image diagnostic system 110, similar to the data storage 116.

The computing device 120 can include any networked device operable to connect to the network 140. A networked device is a device capable of communicating with other devices through a network such as the network 140. A network device may couple to the network 140 through a wired or wireless connection. Although only one computing device 120 is shown in FIG. 1, it will be understood that more computing devices 120 can connect to the network 140.

The computing device 120 may include at least a processor and memory, and may be an electronic tablet device, a personal computer, workstation, server, portable computer, mobile device, personal digital assistant, laptop, smart phone, an interactive television, video display terminals, and portable electronic devices or any combination of these.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, Ultra-wideband, Bluetooth®), SS7 signaling network, fixed line, local area network, wide area network, and others, including any combination of these, capable of interfacing with, and enabling communication between, the medical image diagnostic system 110, the computing device 120, and the external data storage 130.

It will be understood that some components of FIG. 1, such as components of the medical image diagnostic system 110 or the external data storage 130, can be implemented in a cloud computing environment.

Figure 2:
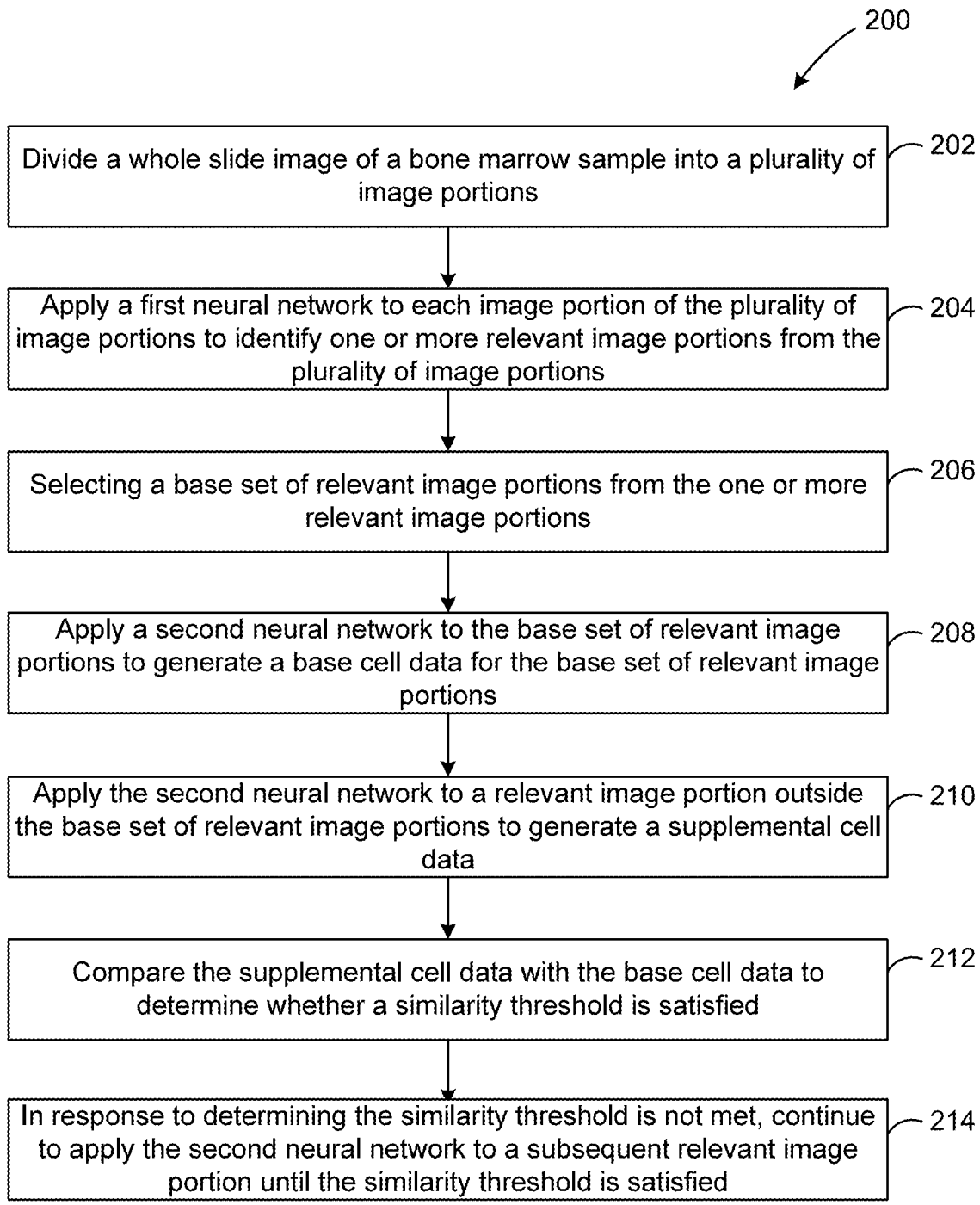
FIG. 2 is a flowchart of an example method for automatically identifying features of a cytology specimen.

Reference now is made to FIG. 2, which illustrates a flowchart for a method 200 of automatically identifying features of a cytology specimen, in accordance with some embodiments. To assist with the description of the method 200 shown in FIG. 2, reference will be made simultaneously to FIG. 3A to FIG. 6D. A medical image diagnostic system, such as medical image diagnostic system 110 having a processor 112 can be configured to implement method 200.

Method 200 can begin at 202, when the processor 112 divides a whole slide image of a cytology specimen into a plurality of image portions. The whole slide image can be a digital whole slide image (DWSI) that is acquired from the glass slide by a digital slide scanner. The whole slide image can be a high-resolution image. In some embodiments, the whole slide image can be retrieved from a data storage component, such as data storage component 116 or external data storage 130.

Figure 3A:
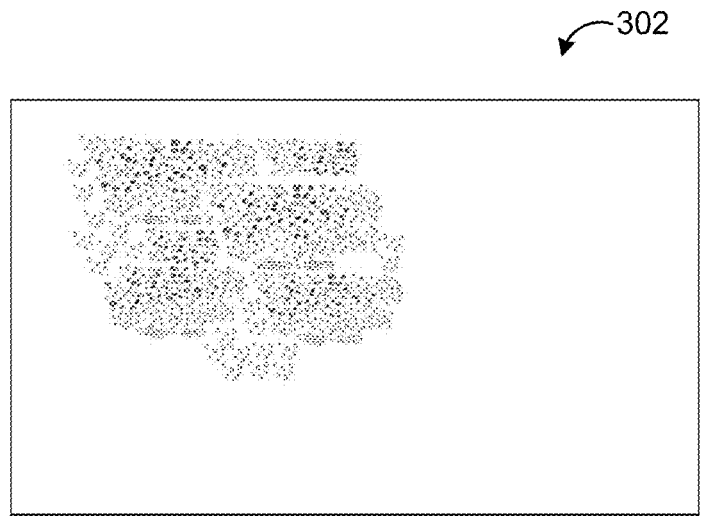
FIG. 3A is an illustration of an example whole slide image of a cytology specimen.

An example whole slide image 302 of a cytology specimen is shown in FIG. 3A. A cytology specimen can be a blood film or a bone marrow aspirate specimen. A cytology specimen can be acquired from a patient and pushed (see e.g., FIG. 4A), crushed or squashed (see e.g., FIG. 4B), spread, and/or smeared across a glass slide. The action of pushing, crushing, squashing, spreading, and/or smearing a bone marrow specimen can release individual bone marrow cells, which are then fixed and stained to provide a bone marrow aspirate for analysis.

Figure 3B:
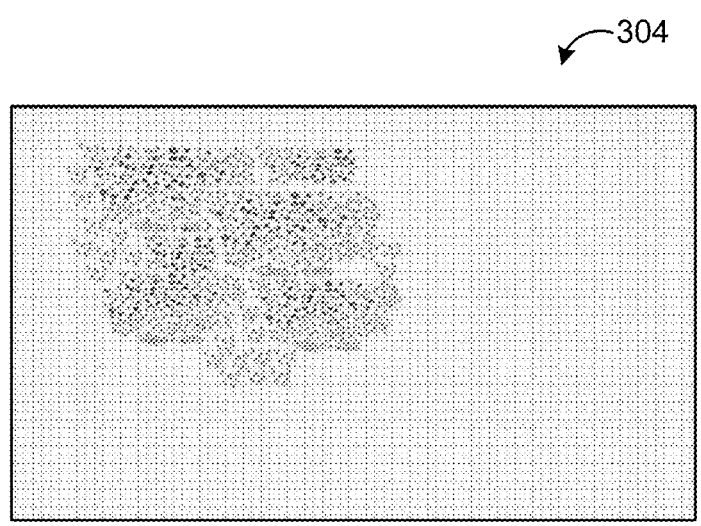
FIG. 3B is an illustration of the whole slide image of FIG. 3A divided in image portions.

As shown in the example of FIG. 3B, the processor 112 can generate a grid to divide the whole slide image 302 into a plurality of substantially equal sized image portions 304. In some embodiments, a grid of 15 rows and 20 columns can be generated on each digital whole slide image to divide the digital whole slide image into a plurality of image portions. In some embodiments, a grid with the size of 80 by 100 can be generated on each digital whole slide image to divide the digital whole slide image into a plurality of image portions. In some embodiments, each image portion can be selected from the center of each grid cell to ensure that all image portions are sampled from the digital whole slide evenly. For example, the image portions can have a size of 512×512 pixels.

The image portions can also be called image tiles or patches. In some embodiments, the processor 112 can divide the whole slide image 302 into larger or smaller image portions than that shown in FIG. 3B. In some embodiments, one or more image portions of the plurality of image portions can be shaped differently. In some embodiments, one or more image portions of the plurality of image portions can be sized differently. In some embodiments, one or more image portions of the plurality of image portions can overlap. In some embodiments, image portions may not be selected from the center of each grid cell.

At 204, the processor 112 can apply a first neural network to each image portion of the plurality of image portions 304 to identify one or more relevant image portions from the plurality of image portions. Each relevant image portion is an image portion containing a region of interest for the cytology specimen. That is, the processor 112 can identify image portions containing a region of interest suitable for diagnosis as being relevant. For example, regions that are thinly spread, free from significant cellular overlap, free from overstaining, and/or clearly show the subtle and complex cytological features can be regions of interest.

Figure 3C:
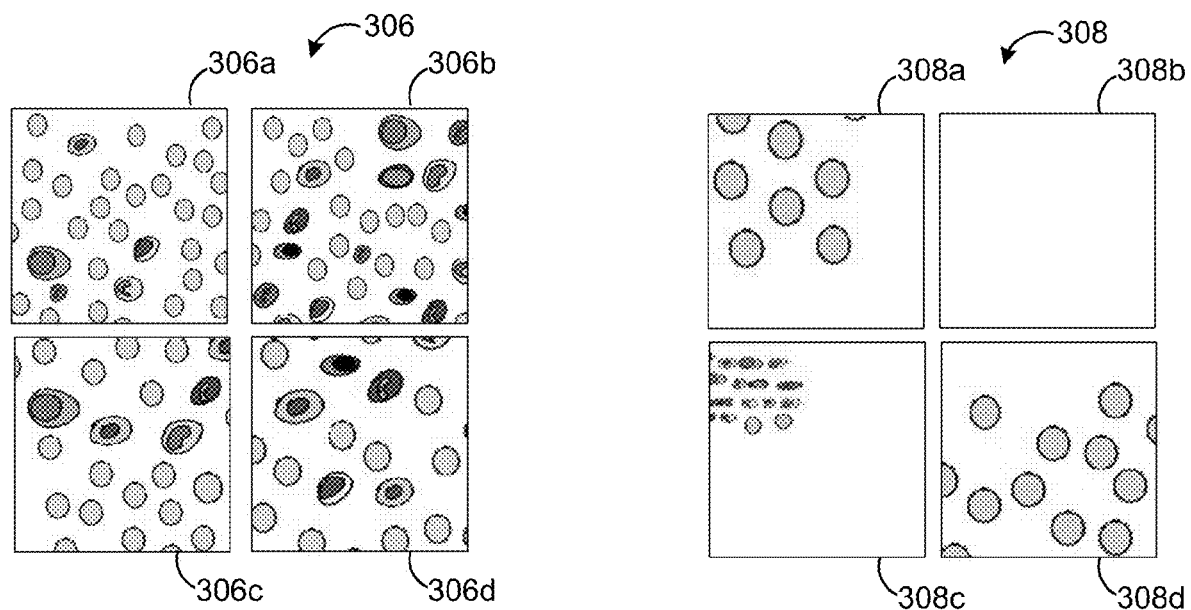
FIG. 3C are illustrations of example relevant image portions identified from the image portions of FIG. 3B and example image portions not identified from the image portions of FIG. 3B as relevant.

FIG. 3C shows example image portions 306a, 306b, 306c, 306d identified as being relevant image portions (collectively referred to as relevant image portions 306) and example image portions 308a, 308b, 308c, 308d not identified as relevant image portions (collectively referred to as image portions not identified as relevant 308).

Figure 3D:
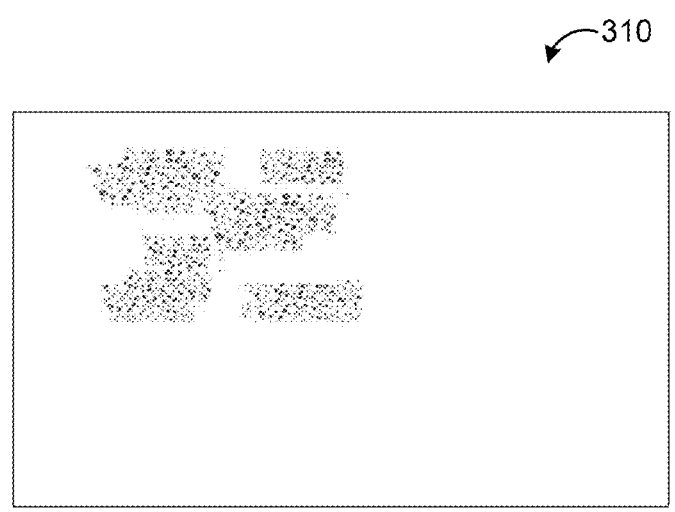
FIG. 3D is an illustration of example regions of interest detected in the whole slide image of FIG. 3A.

In some embodiments, the processor 112 can iteratively apply the first neural network to image portions of the plurality of image portions 304. That is, the processor 112 can apply the first neural network to a first image portion of the plurality of image portions, such as example image portion 306a, and subsequently apply the first neural network to a second image portion of the plurality of image portions, such as example image portion 308a. The processor 112 can continue to apply the first neural network to each image portion of the plurality of image portions 304. An example of the image portions of the whole slide image 302 of FIG. 3A identified as being relevant image portions 310 is shown in FIG. 3D.

Figure 6A:
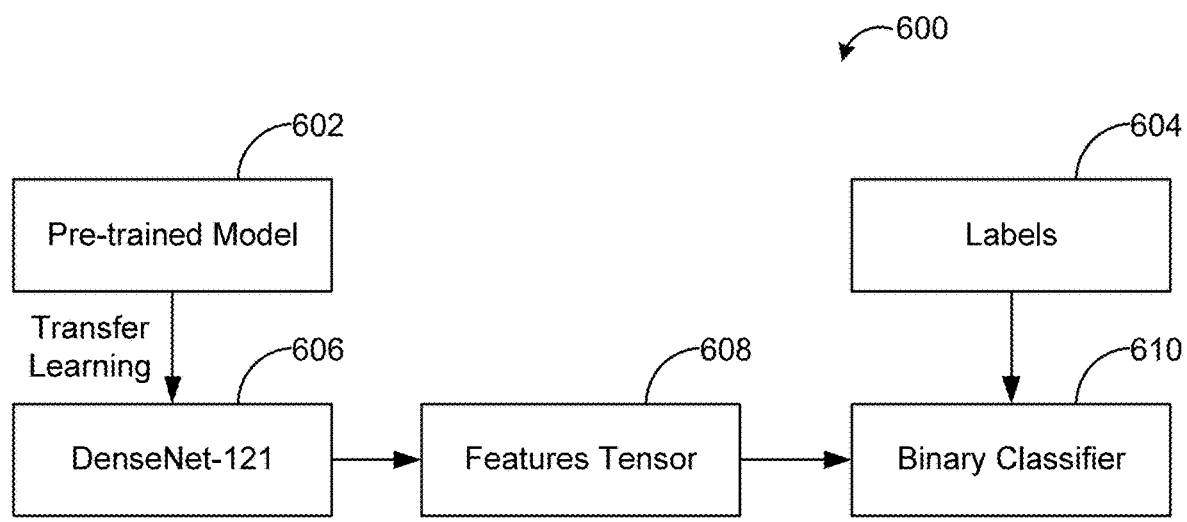
FIG. 6A is a schematic of an example neural network architecture.

In some embodiments, the first neural network can be a deep neural network. FIG. 6A shows the architecture of an example neural network 600 for identifying relevant image portions. For example, the first neural network 600 can have an architecture based on a DenseNet-121 architecture 606. The first neural network 600 can include a features tensor 608. The first neural network can also include binary classifier 610 in the last layer to identify each image portions as one of two labels 604, namely a relevant image portion or an image portion not identified as relevant.

The first neural network can be pre-trained, fine-tuned, and evaluated prior to use in method 200. In some embodiments, training the first neural network to identify relevant image portions can involve using a cross entropy loss function and an AdamW optimizer with a learning rate of 1E-4 and weight decay of 5.0E-4. The pre-trained neural network 402 can initialize weights prior to fine-tuning. The first neural network can be fine-tuned for 20 epochs with a batch size of 32, in which each epoch passes all samples in the training data.

In some embodiments, a 5-Folds cross-validation method can be applied to train the first neural network to identify relevant image portions. For example, a training dataset can be split into two portions in each fold: 80% for a training partition and 20% for a test-validation partition. The test-validation partition can be further split into two partitions: 70% for a validation partition and 30% for a test partition. Further splitting the test-validation partition can ensure an unbiased evaluation of the fit of the first neural network on the data of the training partition while tuning the hyper parameters of the neural network. In addition, to ensure that sufficient data for each class is included in the partitions, the data partitioning can be applied on relevant image portions separate from image portions not identified as relevant.

In each fold, the neural network can be selected by running on the validation partition after the training and then evaluated on the test partition, which is unseen. Since the first neural network is trained to identify relevant image portions for further processing, the first neural network can return the minimum false positive ("FP") in the result. Accordingly, the first neural network can be selected based on a metric of precision.

In some embodiments, the first neural network is trained to identify the regions of interest suitable for identifying features of the cytology specimen. The regions of interest can be used to reduce the storage requirements of a whole slide image. For example, instead of storing a whole slide image, such as example whole slide image 302, only the regions of interest of the whole slide image, such as example relevant image portions 310, can be stored.

Figure 4A:
FIG. 4A is an example whole slide image of a cytology specimen.
Figure 4B:
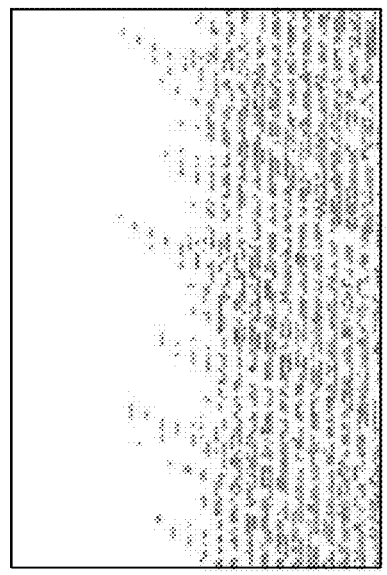
FIG. 4B is another example whole slide image of a cytology specimen.
Figure 4C:
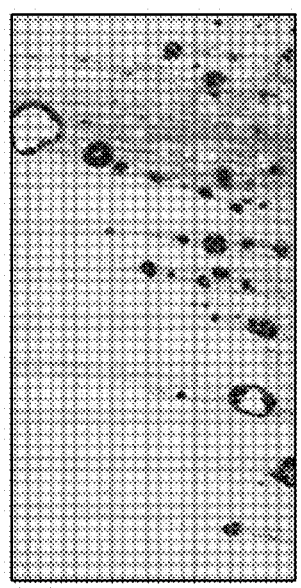
FIG. 4C shows example regions of interest detected in the whole slide image of FIG. 4A.
Figure 4D:
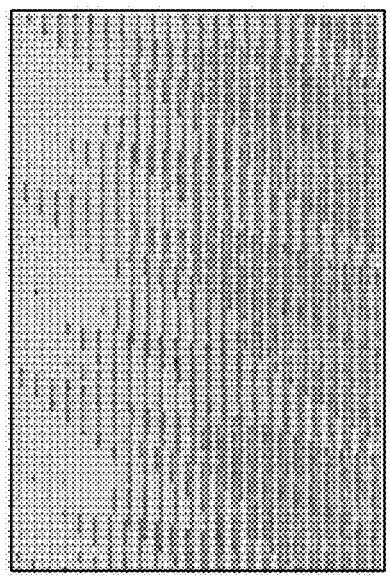
FIG. 4D shows example regions of interest detected in the whole slide image of FIG. 4B.

Furthermore, the processing time for the whole slide image can be improved. Instead of processing a whole slide image, the processor can automatically detect the regions of interest of the whole slide image and only further process the regions of interest. For example, the time required for scanning regions of interest of a whole slide image can be less than the time required for scanning the whole slide image in its entirety. The processing that is saved by only processing regions of interest instead of a whole slide image can be seen by comparing whole slide image 402a of FIG. 4A with the corresponding regions of interest 404a in FIG. 4C identified by the processor 112. As can be seen, regions of interest 404a is a subset, and relatively smaller than, the whole slide image 402a. Similarly, regions of interest 404b identified by the processor in FIG. 4D is much less than the whole slide image 402b of FIG. 4B.

In some embodiments, the processor 112 can, from a thumbnail preview of a whole slide image, automatically detect, display, and store only the regions of interest from the whole slide image. The region of interest can be used for display purposes. The processor 112 can automatically display a region of interest of a whole slide image to fit a viewing area when the whole slide image is selected for viewing.

Figure 5A:
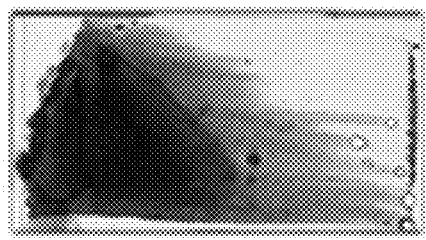
FIG. 5A is an example whole slide image of a cytology specimen.

Reference is now to FIGS. 5A to 5F, which illustrate an example of the identification of a region of interest for a whole slide image. A whole slide image 502 of a cytology specimen is shown in FIG. 5A. While FIG. 5A shows an example cytology specimen that is a bone marrow aspirate specimen, in some embodiments, the cytology specimen can be a blood film.

Figure 5B:
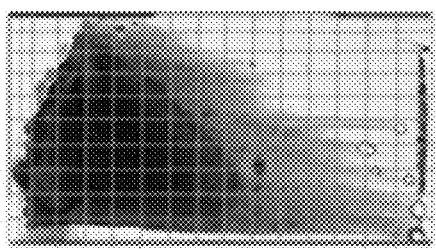
FIG. 5B shows the example whole slide image of FIG. 5A divided into image portions.
Figure 5C:
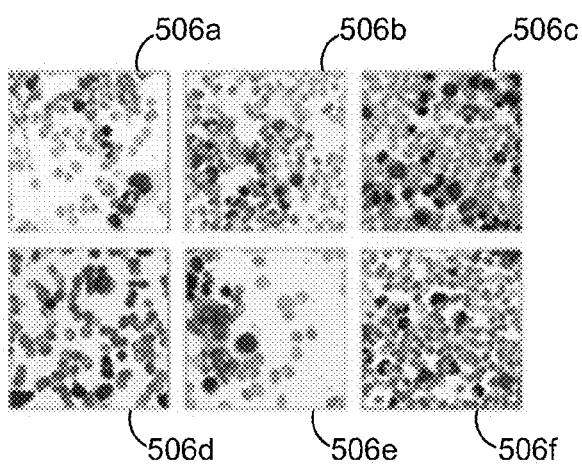
FIG. 5C shows example relevant image portions identified by the example methods and systems disclosed herein from the image portions of FIG. 5B.
Figure 5D:
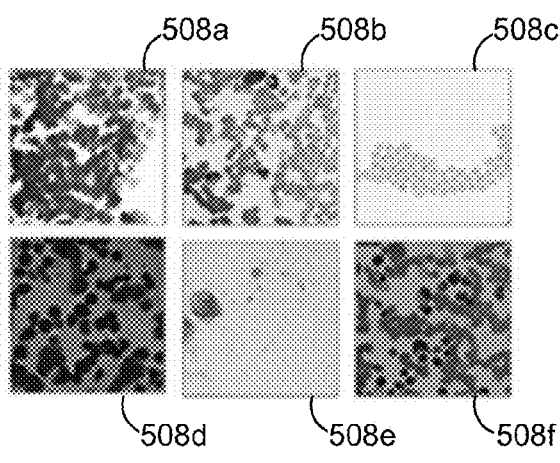
FIG. 5D shows example image portions from the image portions of FIG. 5B not identified by the example methods and systems disclosed herein as relevant.

The processor 112 can divide the whole slide image 502 into a plurality of image portions 504 as shown in FIG. 5B. The processor 112 can apply a neural network to identify each image portion of the plurality of image portions as a relevant image portion. The remaining image portions are image portions that have not been identified as relevant. Examples of relevant image portions 506a, 506b, 506c, 506d, 506e, and 506f (collectively referred to as 506) and image portions not identified as relevant 508a, 508b, 508c, 508d, 508e, and 508f (collectively referred to as 508) are shown in FIGS. 5C and 5D, respectively.

Figure 5E:
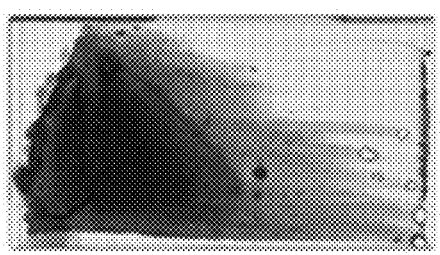
FIG. 5E shows example regions of interest of the whole slide image of FIG. 5A.
Figure 5F:
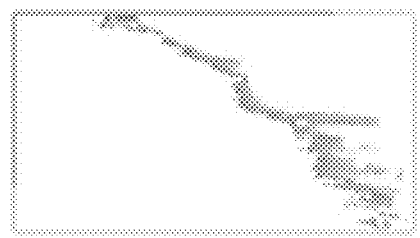
FIG. 5F shows another example regions of interest of the whole slide image of FIG. 5A.

FIG. 5E shows the whole slide image 510 with relevant image portions highlighted to distinguish from image portions that have not been identified as relevant. FIG. 5F shows the whole slide image 512 with only relevant image portions— that is, the relevant image portions in isolation. As can be seen in FIG. 5F, only a small number of the plurality of image portions for a whole slide image may be relevant. For example, in some embodiments, only about 10% to about 15% of a whole slide image can be relevant. Accordingly, only storing and displaying the relevant image portions of a whole slide image can reduce processing and storage requirements.

Figures 3E, 3F:
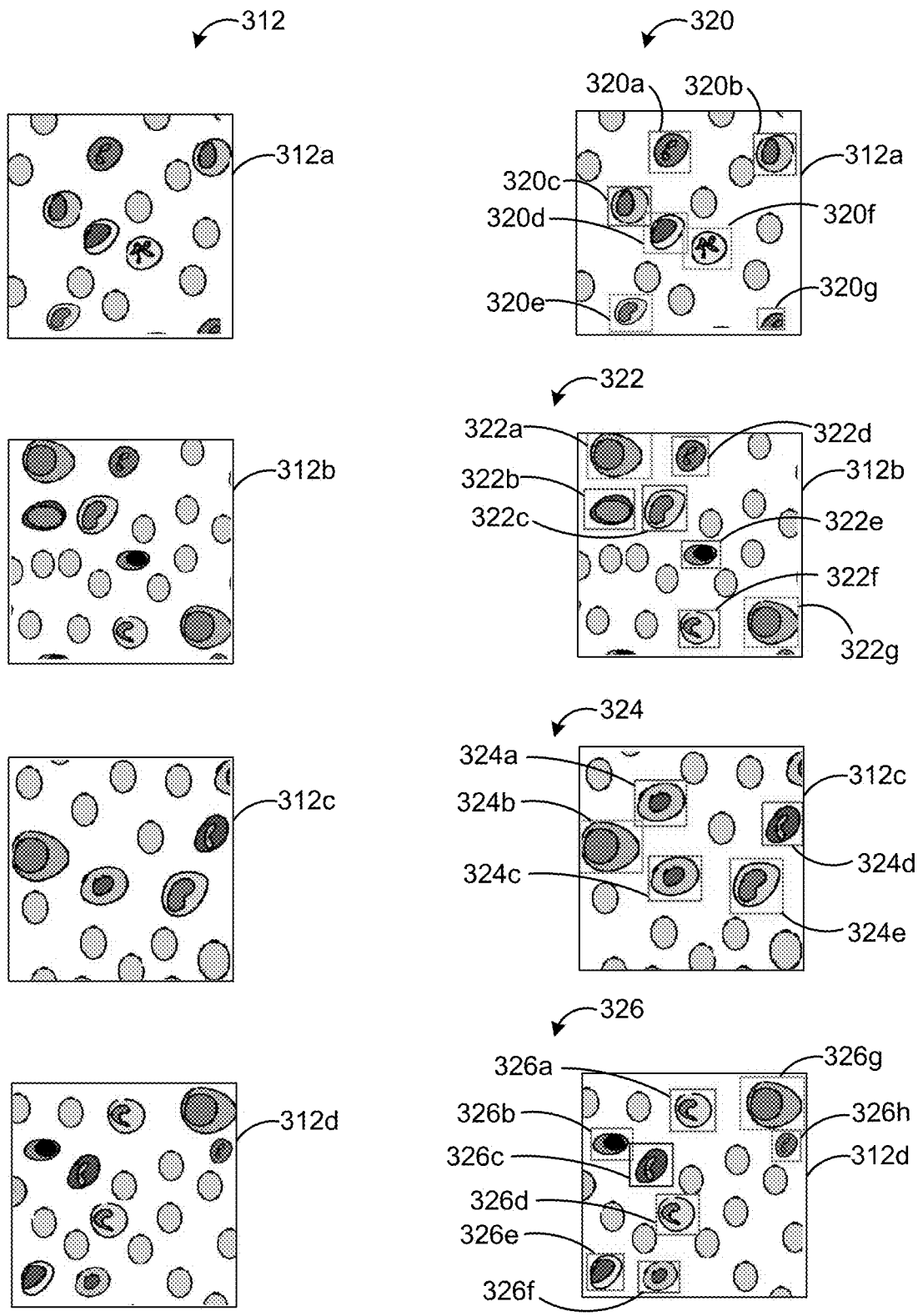
FIG. 3E is an illustration of an example base set of relevant image portions.
FIG. 3F is an illustration of example predicted features in the base set of relevant image portions of FIG. 3E.

Returning now to FIG. 2, at 206, the processor 112 selects a base set of relevant image portions from the one or more relevant image portions. The base set includes at least one relevant image portion. FIG. 3E shows an example base set of relevant image portions that includes a plurality of relevant image portions 312a, 312b, 312c, and 312d (collectively referred to as base set 312). Although base set 312 is shown as including four image portions, the base set can include fewer or more image portions. In some embodiments, the base set can include about 60 image portions. In some embodiments, the base set 312 can be randomly selected from the relevant image portions 310.

At 208, the processor 112 can apply a second neural network to the base set of relevant image portions 312 to generate a base cell data for the base set of relevant image portions 312. In some embodiments, the second neural network is trained to detect and identify the features within the cytology specimen.

FIG. 3F shows example features identified within the base set 312. The processor 112 can detect features within the relevant image portion. In some embodiments, the processor 112 can generate a boundary within which the features are detected. For example, the processor 112 can generate bounding boxes 320a, 320b, 320c, 320d, 320e, 320f, 320g (collectively referred to as bounding boxes 320) for relevant image portion 312a containing features therein. Similarly, the processor 112 can generate bounding boxes 322a, 322b, 322c, 322d, 322e, 322f, 322g (collectively referred to as bounding boxes 322) for relevant image portion 312b; bounding boxes 324a, 324b, 324c, 324d, 324e (collectively referred to as bounding boxes 324) for relevant image portion 312c; and bounding boxes 326a, 326b, 326c, 326d, 326e, 326f, 326g, 326h (collectively referred to as bounding boxes 326) for relevant image portion 312d, each containing features therein.

The base cell data includes a predicted feature type and an accuracy likelihood for the predicted feature type for each relevant image portion of the base set of relevant image portions. In some embodiments, predicted feature type can be one of 19 different feature types. In some embodiments, the predicted feature type includes a predicted cell type. In some embodiments, the predicted feature type includes a predicted non-cellular type.

Figure 7A:
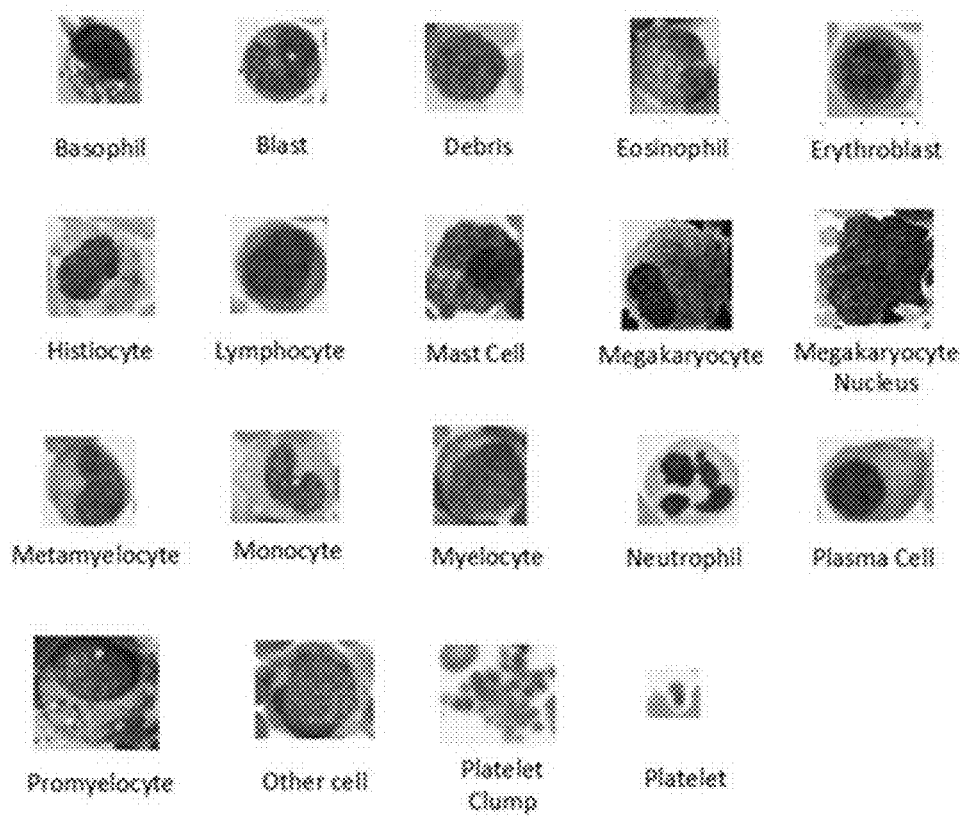
FIG. 7A show images of example cellular and non-cellular feature types.

Returning to the example of relevant image portion 312a of FIG. 3F, the processor 112 can identify the features within one or more of bounding boxes 320 as being a cell type or a non-cellular type. Furthermore, the processor 112 can identify the features as being a particular cell type, such as but not limited to, Neutrophil, Metamyelocyte, Myelocyte, Promyelocyte, Blast, Erythroblast, Megakaryocyte nucleus, Lymphocyte, Monocyte, Plasma cell, Eosinophil, Basophil, Megakaryocyte, Mast cell, Histiocyte, or Other cell type, or a particular non-cellular type, such as but not limited to Debris, Platelet, or Platelet clump. Examples of these feature types are shown in FIG. 7A.

Figures 3G, 3H:
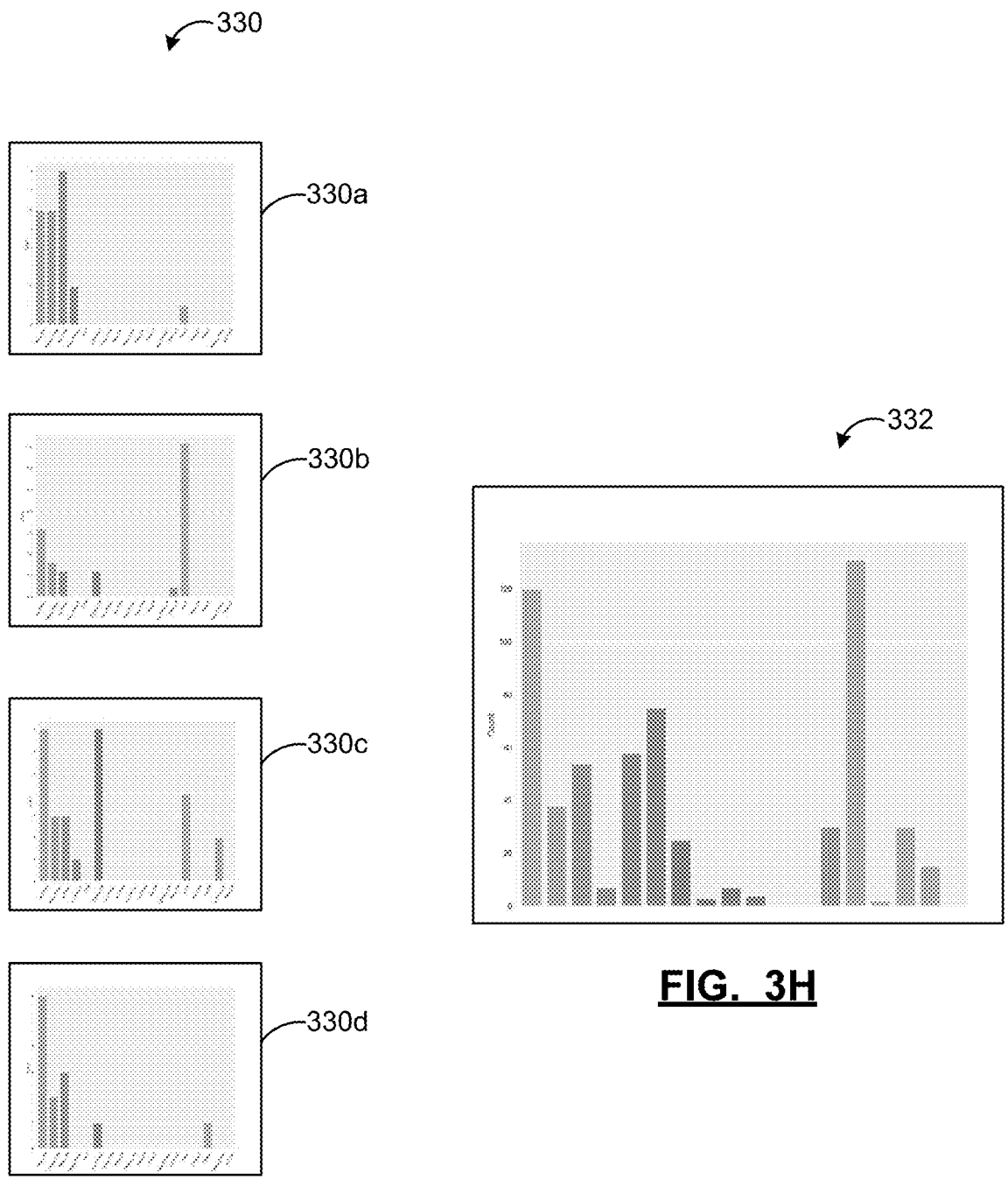
FIG. 3G show example histograms representing the predicted features of FIG. 3F.
FIG. 3H shows another example histogram representing the predicted features of FIG. 3F.

In some embodiments, the processor 112 can generate a histogram to represent the predicted feature types for each relevant image portion. That is, the histogram for each relevant image portion can represent the distribution of the predicted feature types in the relevant image portion. FIG. 3G shows example histograms 330a, 330b, 330c, 330d (collectively referred to as image portion histograms 330) representing cell data for example relevant image portions 312a, 312b, 312c, 312d, respectively. As shown in histogram 330a, five different cell types are identified in relevant image portion 312a. As shown in histogram 330c, seven different cell types are identified in relevant image portion 312b. Image portion histograms 330 illustrate the range of feature types and relative quantity of each feature type identified in a relevant image portion.

In some embodiments, the processor 112 can generate a histogram to represent the base cell data. The histogram of the base cell data can be representative of the accuracy likelihood distribution of feature types. Since feature types can include bone marrow cells, the histogram of the base cell data can act as a patient-specific cytological fingerprint. For example, FIG. 3H shows an example histogram 332 representing cell data for all relevant image portions of example base set 312. In some embodiments, the processor 112 can generate histogram 332 from image portion histograms 330. That is, the processor 112 can combine the image portion histograms 330 to generate a histogram 332 to represent the base cell data.

The second neural network can be customized, trained, fine-tuned, and evaluated prior to use in method 200. In some embodiments, the second neural network for detecting and identifying feature types of the image portions can be a deep neural network. In some embodiments, the second neural network can include a YOLO-based (i.e., You Only Look Once) object detection and classification model. For example, the second neural network can include a Yolov4 model. With a YOLO-based model, features within relevant image portions can be localized and classified in a single step. That is, the YOLO-based model can simultaneously identify and localize features in an image portion (e.g., predict a feature type and a bounding box) and assign an accuracy likelihood for the predicted feature, such as a class probability. The YOLO-based model can generate a set of real numbers that captures both object localization in an image and an object class probability. This can solve both object detection and classification problems at the same time in a regression approach. Furthermore, a Yolov4 model, can be optimized for small object detection and use complete intersection-over-union loss (CIoU-loss), which can result in faster convergence and better accuracy for bounding box prediction. These factors can collectively increase computational efficiency and speed.

Figure 6B:
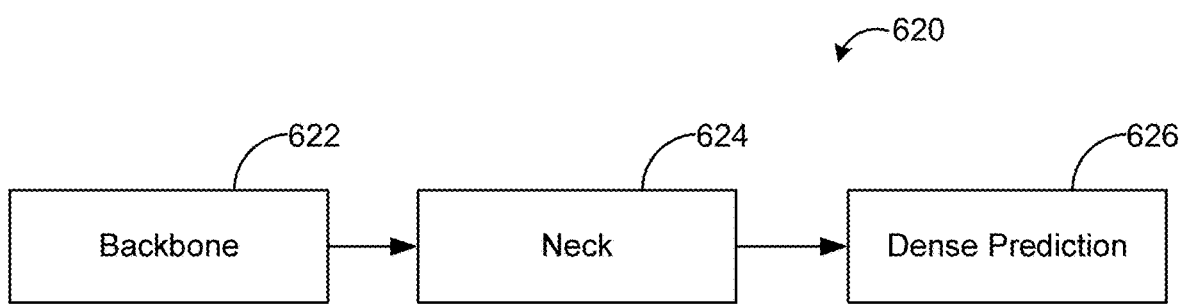
FIG. 6B is a schematic of another example neural network architecture.

In some embodiments, the second neural network can include a backbone to extract features. For example, CSP-Darknet53 can be used as the backbone. In some embodiments, the second neural network can include a neck to enhance feature descriptability and robustness. For example, Spatial Pyramid Pooling (SPP) and Path Aggregation Network (PAN) can be used as the neck. In some embodiments, the second neural network can include a head to classify the extracted features. For example, a Yolov3 model can be used as the head. FIG. 6B shows the architecture of an example neural network 620 including a backbone 622, a neck 624, and a dense prediction as the head 626.

In some embodiments, the second neural network can include bag of specials (BOS) for the backbone (e.g., Mish activation function, Cross-stage partial connection (CSP) and Multi input weighted residual connection (MiWRC)), and BOS for the detector (e.g., Mish activation function, SPP-block, SAM-block, PAN path-aggregation block, and Distance-IoU-NMS). In some embodiments, the second neural network can include bag of freebies (BOF) for the backbone (e.g., CutMix and Mosaic data augmentations, DropBlock regularization, and Class label smoothing), and BOF for the detector (e.g., CIoU loss, Cross mini-Batch Normalization (CmBN), DropBlock regularization, Mosaic data augmentation, Self-Adversarial training, Eliminate grid sensitivity, using multiple anchors for single ground truth, Cosine annealing scheduler (stochastic gradient descent with warm restarts), optimal hyper parameters and random training shapes). In some embodiments, the hyper parameters for the second neural network can be max_batches of 130000; training steps of 104000 and 117000; batch size 64 with subdivision 16; applying the polynomial decay learning rate scheduling strategy with an initial learning rate of 0.001; the momentum and weight decay set as 0.949 and 0.0005, respectively; warmup step of 1000; and Yolo network size of 512 in both height and width.

In some embodiments, a 5-folds cross-validation method can be applied to train the second neural network to detect and identify features within an image portion. Similar to training the first neural network, the training dataset can be divided into a training partition and a test-validation partition of 80% and 20%, respectively; and the test-validation partition can be further split into a validation partition and a test partition of 70% and 30%, respectively. In addition, to ensure that sufficient data for each object class is included in the partitions, the data partitioning can be applied on each object class type individually. In each fold, the neural network is selected by running on the validation partition and then evaluated on the test partition, which is unseen. In some embodiments, evaluation can be based on the mean average precision (mAP).

Figure 7B:
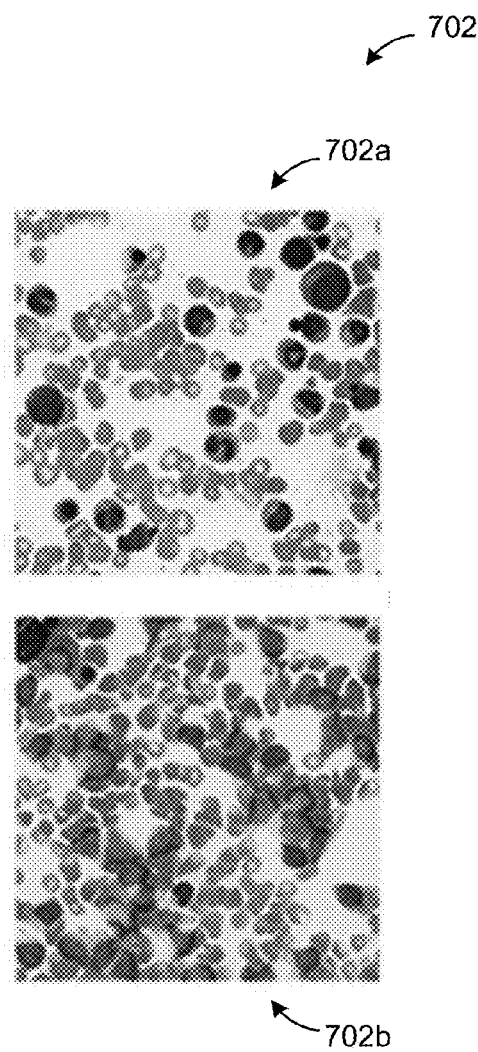
FIG. 7B show two example relevant image portions.
Figure 7C:
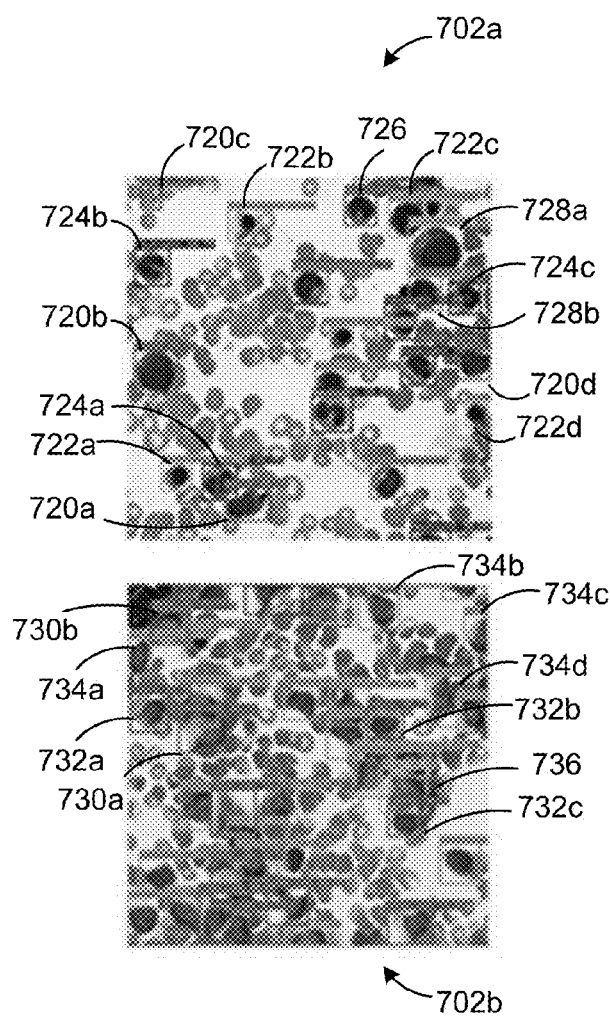
FIG. 7C show the two relevant image portions annotated with predicted features with the example methods and systems disclosed herein.
Figure 7D:
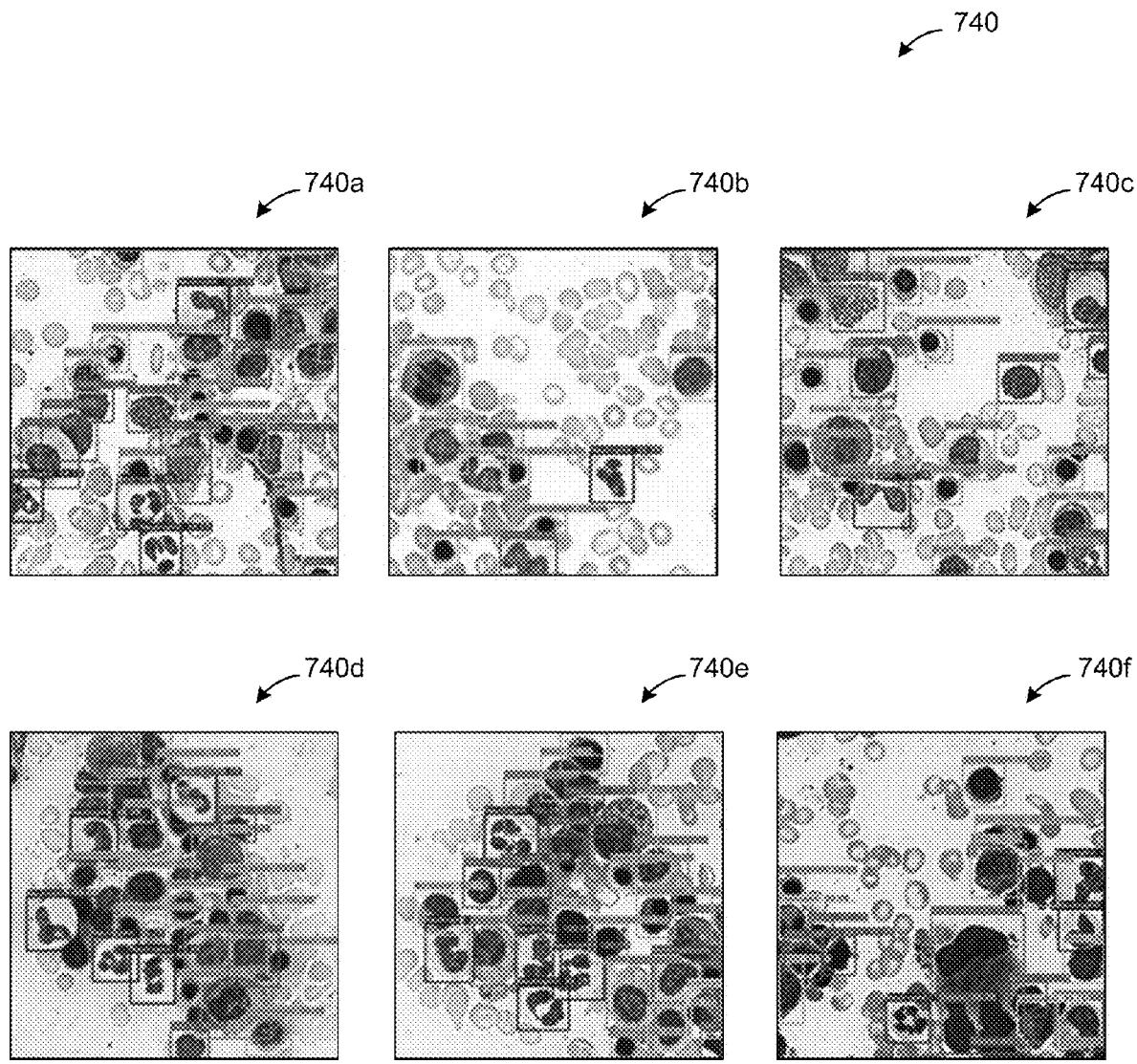
FIG. 7D show example relevant image portions annotated with predicted features with the example methods and systems disclosed herein.

Reference is now to FIGS. 7B and 7C, which illustrate examples of the detection and identification of features within image portions. Relevant image portions 702a and 702b (collectively referred to as 702) are shown in FIG. 7B. The processor 112 can apply a neural network to each image portion to detect and identify features within the image portion. For example, the processor 112 can detect features 720a, 720b, 720c, 720d (collectively referred to as 720); 722a, 722b, 722c, 722d (collectively referred to as 722); 724a, 724b, 724c (collectively referred to as 724); 726; 728a, 728b, (collectively referred to as 728) in image portion 702a and features 730a, 730b (collectively referred to as 730); 732a, 732b, 732c (collectively referred to as 732); 734a, 734b, 734c, 734d (collectively referred to as 734); 736 in image portion 702b. Furthermore, the processor 112 can identify each feature as being a particular feature types, such as example feature types 720, 722, 724, 726, and 728 in image portion 702a and example feature types 730, 732, 734, and 736 in image portion 702b. It is noted that for clarity, not all predicted features in relevant image portions 702 by the processor 112 are labelled in FIG. 7C. Additional example features are shown in image portions 740a, 740b, 740c, 740d, 740e, and 740f (collectively referred to as 740) in FIG. 7D.

At 210, the processor 112 applies the second neural network to a relevant image portion outside the base set of relevant image portions to generate a supplemental cell data. The relevant image portion outside of the base set of relevant image portions 312 can be selected from the relevant image portions 310 identified at 204 and not selected for the base set at 206. In some embodiments, the relevant image portion outside the base set can be randomly selected from the relevant image portions 310. In some embodiments, the processor 112 can apply the second neural network to a plurality of relevant image portions outside the base set of relevant image portions to generate a supplemental cell data. That is, the processor 112 can select a supplemental set of relevant image portions outside of the base set of relevant image portions 312 and apply the second neural network to the supplemental set to generate the supplemental cell data.

Similar to 208, the processor 112 can detect and identify features within the relevant image portion outside the base set. The processor 112 can generate a boundary within which the features are detected. Similar to the base cell data, the supplemental cell data includes a predicted feature type and an accuracy likelihood for the predicted feature type for the relevant image portion outside the base set.

In some embodiments, the processor 112 can generate a histogram to represent the predicted feature types for the relevant image portion outside the base set. For example, the processor 112 can generate a histogram to represent the supplemental cell data.

At 212, the processor 112 can compare the supplemental cell data with the base cell data to determine whether a similarity threshold is satisfied. When the similarity threshold is satisfied, the processor 112 can determine that the base cell data has converged. In some embodiments, convergence of the base cell data can indicate that the bone marrow nucleated differential cell count is complete. That is, the base cell data can be representative of the bone marrow nucleated differential cell count.

In some embodiments, the processor 112 can apply a statistical model to the supplemental cell data and the base cell data to determine whether the similarity threshold is satisfied. For example, the processor 112 can determine a chi-square distance between the supplemental cell data and the base cell data. The chi-square distance can be determined according to equation (1):

$$Chi-square\ distance = \frac{1}{2}\sum_{k=1}^{m} \frac{(x_i - y_i)^2}{(x_i + y_i)} \quad (1)$$

In some embodiments, the chi-square distance can be based on the following cellular feature types: Neutrophil, Metamyelocyte, Myelocyte, Promyelocyte, Blast, Erythroblast, Lymphocyte, Monocyte, Plasma cell, Eosinophil, Basophil, Megakaryocyte. In some embodiments, determining the chi-square distance can also involve determining a bone marrow M:E ($BM_{ME}$) ratio in accordance with equation (2):

$$BM_{ME} ratio = \left( \frac{Blast + Promyelocyte + Myelocyte + Metamyelocyte + Neutrophil + Eosinophil}{Erythroblast} \right) \quad (2)$$

In some embodiments, a first average of the chi-square distance for the base cell data and a second average of the chi-square distance for the supplemental cell data can be determined. The difference between the first and second averages can be compared with the similarity threshold to determine whether the base cell data has converged. For example, a base set can include 30 relevant image portions and a supplemental set can also include 30 relevant image portions. A difference between an average of the chi-square distance for the base set and an average of the chi-square distance for the supplemental set can be determined and compared with the similarity threshold.

Figure 3I:
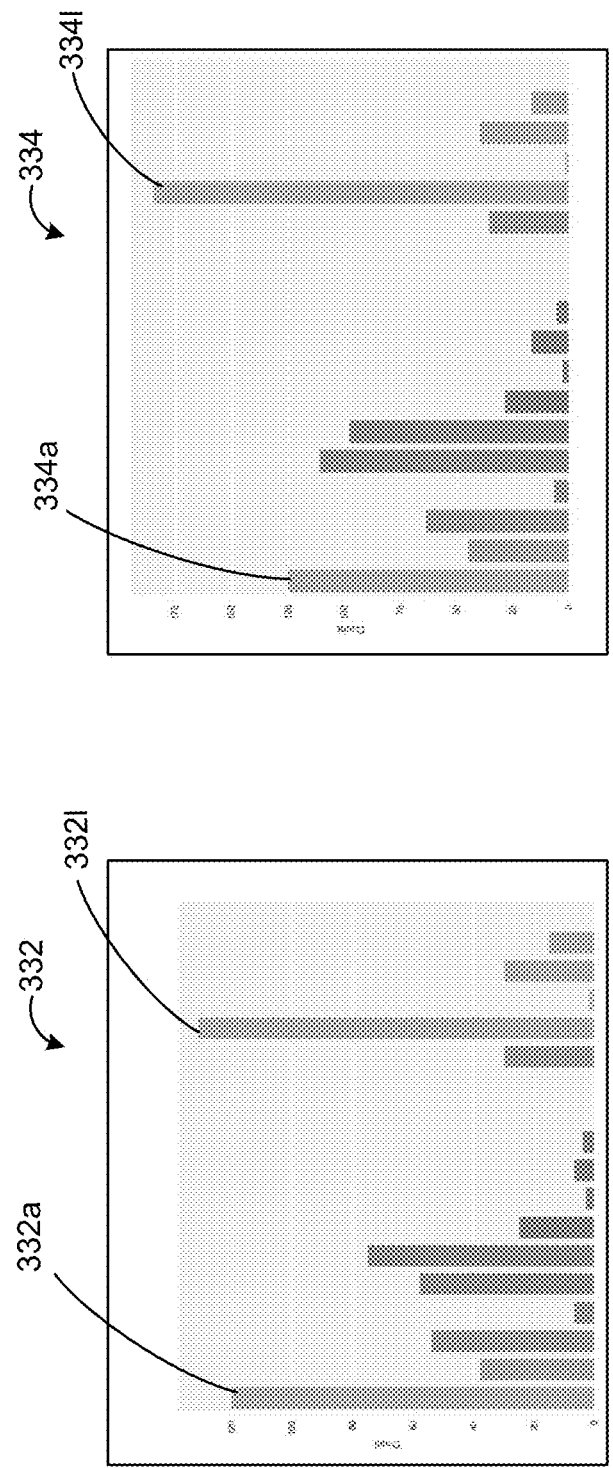
FIG. 3I shows further example histograms representing the predicted features of FIG. 3F.

For illustrative purposes, a comparison of histogram 332 with an example histogram 334 representing the supplemental cell data and the base cell data is shown in FIG. 3I. When the similarity threshold is satisfied at 212, the histograms 332 and 334 can look substantially similar. As can be seen in FIG. 3I, histogram 332 shows that the relative quantity of feature types 332a and 3321 of the base cell data is different than the relative quantity of the same feature types 334a and 3341 of the supplemental cell data and the base cell data.

In some embodiments, in response to determining the similarity threshold is not met, the processor 112 can update the base cell data to include the supplemental cell data.

In response to determining the similarity threshold is not satisfied, the processor 112 can, at 214, continue to apply the second neural network to a subsequent relevant image portion of the one or more relevant image portions until the similarity threshold is met. That is, the processor 112 can reiterate 210 and 212 with a subsequent relevant image portion outside of the base set of relevant image portions until the similarity threshold is met.

Figure 8:
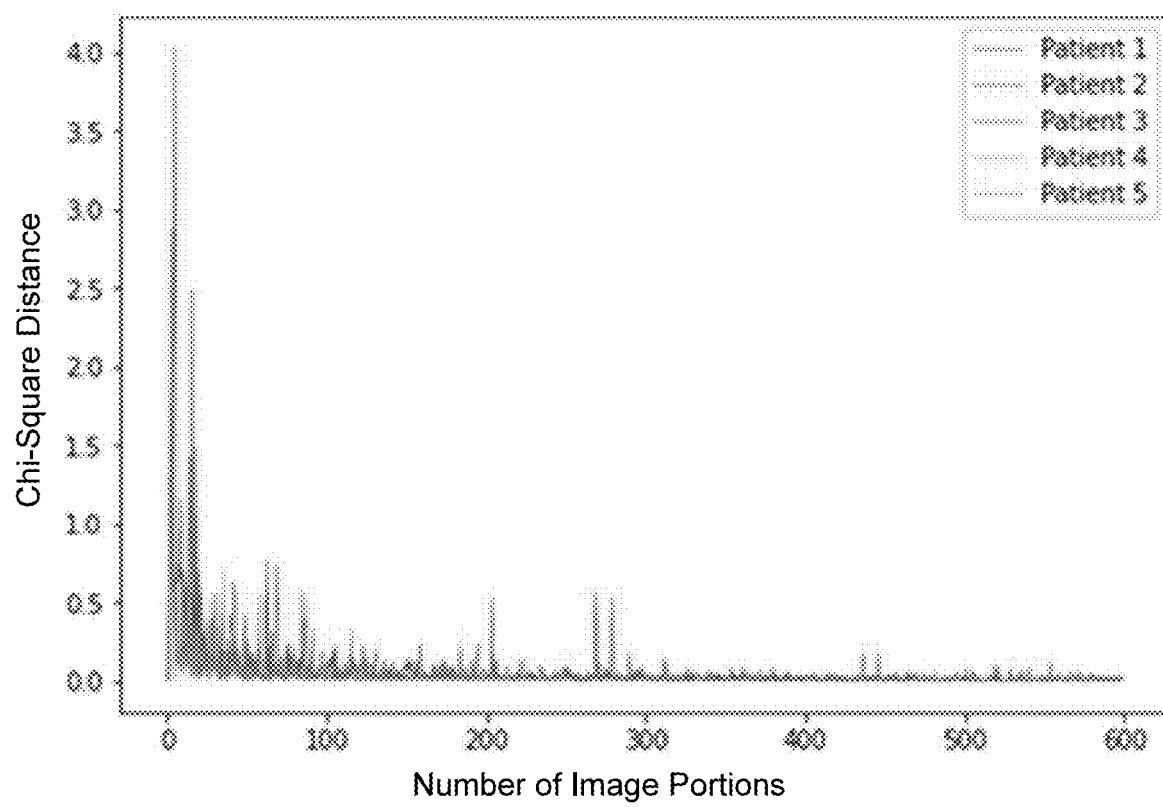
FIG. 8 is a graphical illustration representing example Chi-square distance values.

Reference is now made to FIG. 8, which shows example Chi-square distance values iteratively obtained for five example patients. As shown in FIG. 8, the Chi-square distance generally decreases as the base cell data is updated with supplemental cell data for additional relevant image portions. After cell data from approximately 400 to 500 relevant image portions are included in the base cell data, the Chi-square distance is very small, nearly zero. In some embodiments, the similarity threshold can be satisfied when the base cell data includes cell data from approximately 400 to 500 relevant image portions.

The first neural network and the second neural network can be pre-trained, fine-tuned, and evaluated prior to use in the method of 200. A training dataset can be obtained from over 1000 digital whole slide images acquired over a given time period, representing the complete breadth of diagnoses and cytological findings over that time period. To improve the classification accuracy of the neural networks, one or more over-sampling or under-sampling methods can be applied during training. In some embodiments, over-sampling or under-sampling methods can be utilized when the class distribution of the training dataset is imbalanced. For example, a training dataset containing more than 70,000 image portions not identified as relevant and less than 5000 relevant image portions can be considered imbalanced.

In some embodiments, data augmentation techniques can be used in conjunction with such over-sampling or under-sampling methods. Data augmentation can increase the changeability of the training images. Such data augmentation techniques can be applied pixel-wise to the training images. Data augmentation techniques can include photometric distortions and geometric distortions. Photometric distortion can involve hue, contrast, brightness, or saturation adjustments or adding noise to training images. Geometric distortion can involve flipping, rotating, cropping, or scaling training images.

For example, data augmentation can be applied to the training data during training to over-sample an under-represented class in the training data (e.g., the relevant image portions). After applying data augmentation, the training dataset can contain a greater number of images.

Figure 9A:
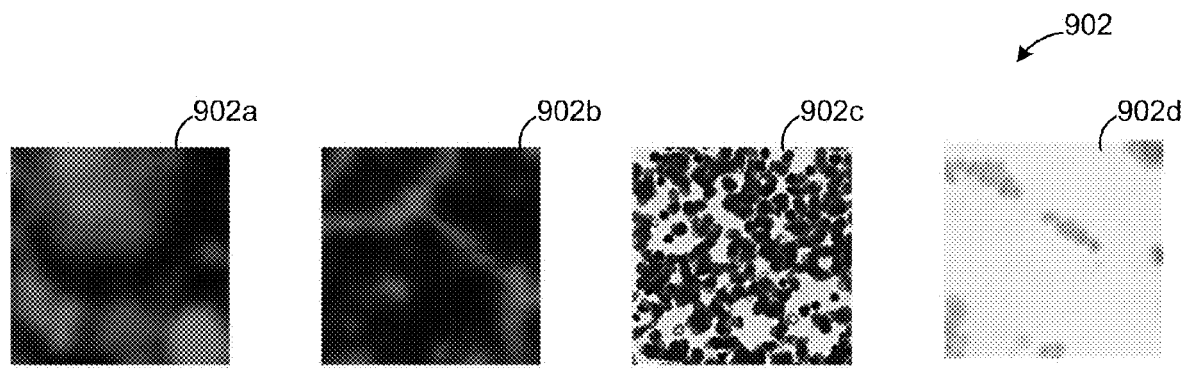
FIG. 9A show example image portions not identified by the example methods and systems disclosed herein as relevant.
Figure 9B:
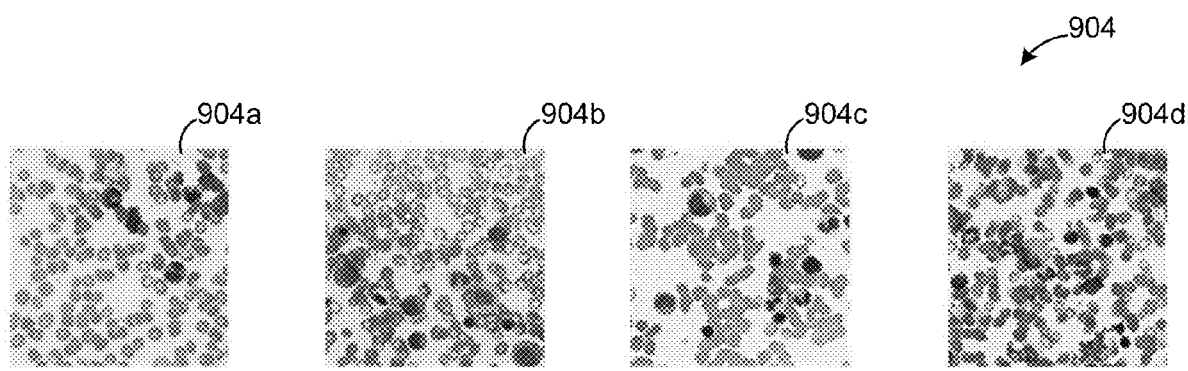
FIG. 9B show example relevant image portions as identified by the example methods and systems disclosed herein.

In some embodiments, photometric distortion and geometric distortion data augmentation techniques can be applied to the training dataset for training the first neural network to identify relevant image portions. Table 1 summarizes an example dataset before and after data augmentation for training a neural network to identify relevant image portions. The example training dataset can be obtained from whole side images of 250 individual patients. Initially, the training dataset included 70,250 image portions that were not identified as relevant and 4,750 image portions annotated as being relevant. FIG. 9A shows examples of image portions 902a, 902b, 902c, and 902d (collectively referred to as 902) that were not annotated as relevant. FIG. 9B shows examples of image portions 904a, 904b, 904c, and 904d (collectively referred to as 904) annotated as being relevant. With data augmentation, the number of image portions annotated as being relevant can be increased to 28,500 image portions.

TABLE 1

| Image Portions | Number of annotated image portions | Number of annotated and augmented image portions |
|---|---|---|
| Image portions not identified as relevant | 70250 | 70250 |
| Relevant image portions | 4750 | 28500 |

Data augmentation can also involve one or more cutmix or mosaic techniques. Cutmix techniques involve mixing two different training images. Mosaic techniques involve mixing four different training images together.

In some embodiments, cutmix and mosaic data augmentation techniques can be applied to the training dataset for training the second neural network to detect and identify features within an image portion. In some embodiments, cutmix and mosaic data augmentation techniques are applied in addition to photometric distortion and geometric distortion data augmentation techniques to the training dataset for training the second neural network.

Table 2 summarizes an example dataset before and after data augmentation for training a neural network to detect and identify features within an image portion. The example training dataset can be obtained from whole side images of 500 individual patients. A subset of relevant image portions of the whole slide images can be selected for annotation. For example, a subset of 3000 relevant image portions can be randomly selected. Initially, the subset can be annotated to have 26,782 annotated features. With data augmentation, the number of relevant image portions can be increased to 132,000 relevant image portions and the number of annotated features can be increased to 1,178,408. It should be noted that to increase the robustness of the neural network, data augmentation can be applied only to the training dataset in each fold of the cross-validation.

Annotating features involves annotating the location of each feature and labelling each feature as one of a plurality of feature types. Annotating the location of each feature can involve creating a boundary generally surrounding a feature, such as but not limited to, a bounding box surrounding the feature. In some embodiments, a graphical software can be used to annotate images. For example, features within a displayed image can be annotated with a feature type and a location. Feature type annotations can be generated by selecting from a predefined feature type, such as a plurality of cellular features (e.g., white blood cell) or non-cellular features. Feature locations annotations can be generated by creating bounding boxes that surround a feature. Both the feature location and feature type (i.e., label) annotations are used for training the neural network to detect and identify feature types.

TABLE 2

| Features | Number of annotated objects | Number of annotated and augmented objects |
|---|---|---|
| Neutrophil | 2714 | 119416 |
| Metamyelocyte | 1017 | 44748 |
| Myelocyte | 1199 | 52756 |
| Promyelocyte | 409 | 17996 |
| Blast | 3950 | 173800 |
| Erythroblast | 2668 | 117392 |
| Megakaryocyte nucleus | 23 | 1012 |
| Lymphocyte | 1305 | 57420 |
| Monocyte | 569 | 25036 |
| Plasma cell | 176 | 7744 |
| Eosinophil | 249 | 10956 |
| Basophil | 7 | 308 |
| Megakaryocyte | 106 | 4664 |
| Debris | 5603 | 246532 |
| Histiocyte | 191 | 8404 |
| Mast cell | 33 | 1452 |
| Platelet | 3971 | 174724 |
| Platelet clump | 585 | 25740 |
| Other cell | 2007 | 88308 |
| Total cell annotated | 26782 | 1178408 |

In some embodiments, training the neural networks can involve active learning. That is, the neural networks can be initially trained with a relatively small training dataset and the neural network can be improved by applying active learning. For example, a neural network can initially be trained with about 1000 image portions to detect and identify features within the image portions. The trained neural network can be applied to new image portions, particularly image portions that include rare cellular and non-cellular features. The features predicted by the trained neural network can be manually verified to generate additional training data. The additional training data can be merged with the current training dataset to provide an updated training dataset. The trained neural network can be retrained with the updated training dataset, including the additional training data. The active learning process can be re-iterated.

In some embodiments, manual verification can be performed a graphical software used to annotate images. Manual verification can involve confirming the features detected and identified, locating features that were not detected, or features that were detected but incorrectly identified. In some embodiments, display of ground truths along with features predicted by the neural network can assist manual verification.

Reference is now made to FIG. 10A and FIG. 10B, which illustrate example features predicted by a neural network compared to ground truth features. Relevant image portion 1002a of FIG. 10A is shown with bounding boxes and labels for ground truth features 1004a, 1004b, 1004c. Features predicted by the neural network that correspond to a ground truth feature are identified as being correct 1008a, 1008b, 1008c. Features predicted by the neural network that do not correspond to a ground truth feature are identified as being 1006a, 1006b, 1006c. Similarly, FIG. 10B shows relevant image portion 1002b with bounding boxes and labels for ground truth features 1014a, 1014b, 1014c, correctly predicted features 1018a, 1018b, 1018c, and detected but incorrectly identified features 1016a, 1016b, 1016c.

By retraining the neural network with additional training data, namely predicted features that are manually verified, the neural network can learn from its mistakes and its performance can be improved. Active learning can also reduce the manual annotation process. Reference now is made to FIG. 11, which illustrates a comparison of the training dataset size and performance of the neural network. As shown in FIG. 11, the performance of the neural network improves as additional image portions are added to the training dataset. FIG. 11 uses mean Average Precision (mAP) as a measure of performance of the neural network. The mAP reaches approximately 0.75 when the size of the training dataset is approximately 3000 image portions.

In addition to mAP, various metrics can be used to evaluate the performance of the neural networks. For example, Equations (3) to (7) can be used to determine Accuracy, Precision (e.g., PPV-Positive Predictive Value), Recall (e.g., sensitivity), Specificity, and Negative Predictive Value (NPV) metrics for the first neural network and/or the second neural network:

$$\text{Accuracy} = \frac{T_p + T_n}{T_p + T_n + F_p + F_n} \quad (3)$$

$$\text{Precision} = \frac{T_p}{T_p + F_p} \quad (4)$$

$$\text{Recall} = \frac{T_p}{T_p + F_n} \quad (5)$$

$$\text{Specificity} = \frac{T_n}{T_n + F_p} \quad (6)$$

$$NPV = \frac{T_n}{T_n + F_n} \quad (7)$$

in which:
  $T_P$ is the number of true positives;
  $T_N$ is the number of true negatives;
  $F_P$ is the number of false positives; and
  $F_N$ is the number of false negatives.

To evaluate the performance of a neural network trained to identify relevant image portions, true positives can be relevant image portions that are predicted correctly; true negatives can be image portions that are correctly not identified as relevant; false positives can be image portions incorrectly predicted as relevant image portions; and false negatives can be relevant image portions that are not identified as relevant.

In some embodiments, a neural network for identifying relevant image portions can be evaluated using 5-folds cross-validation. Table 3 shows an example evaluation using the Accuracy, Precision (PPV-Positive Predictive Value), Recall (Sensitivity), Specificity, and NPV (Negative Predictive Value) metrics provided in Equations (3), (4), (5), (6), and (7), respectively. These metrics can be computed in each fold test (unseen) data separately and the average can be calculated at the end.

TABLE 3

| Metrics | % |
| --- | --- |
| Average Cross-validation Accuracy | 0.97 |
| Average Cross-validation Precision | 0.90 |
| Average Cross-validation Recall | 0.78 |
| Average Cross-validation Specificity | 0.99 |
| Average Cross-validation NPV | 0.99 |

Figure 12:
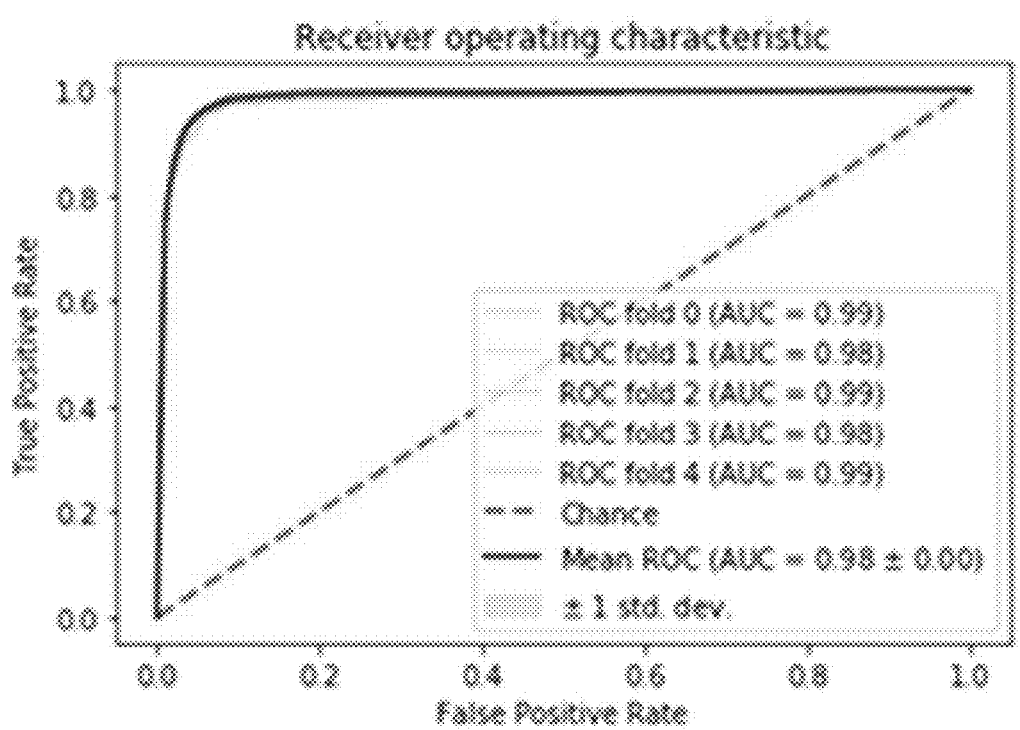
FIG. 12 is a graphical illustration of a performance of an example neural network trained for identifying relevant image portions in accordance with the methods and systems disclosed herein.

In accordance with some embodiments, the neural network for identifying relevant image portions can also be evaluated by determining the mean receiver operating characteristic (ROC), as shown in the example of FIG. 12. The results can be aggregated over all 5-folds cross-validation.

To evaluate the performance of a neural network trained to detect and identify features within an image portion, true positives can be cellular and non-cellular features that are predicted correctly; false positives can be cellular features that are not predicted correctly; and false negatives can be non-cellular features that are not predicted correctly.

In addition to Equations (3) to (7), the neural network for detecting and identifying features within an image portion can also be evaluated using one or more metrics that quantify the feature detection accuracy. For example, Equation (8) provides an Average Precision (AP) that can be used with 11-point interpolation. As noted above, a mean Average Precision (mAP), provided in Equation (9) can be determined for all the AP values.

$$AP = \frac{1}{11}\sum_{r \in \{0.0,\ldots,1.0\}} AP_r = \frac{1}{11}\sum_{r \in \{0.0,\ldots,1.0\}} P_{interp}(r) \quad (8)$$

where $$P_{interp}(r) = \max_{\tilde{r} \geq r} P(\tilde{r})$$

$$mAP = \frac{1}{N}\sum_{i=1}^{N} AP_i \quad (9)$$

In Equation (8), the value of Recall is divided from 0 to 1.0 points and the average of maximum precision value is calculated for these 11 values. Also, the value of 0.5 is considered for Intersection over Union (IoU), provided in Equation (10), in AP for each feature detection.

$$IoU = \frac{GTBox \cap PredBox}{GTBox \cup PredBox} \quad (10)$$

Feature identification of the second neural network can also be evaluated using one or more metrics. Precision in Equation (4), Recall in Equation (5), F1-score in Equation (11), average IoU in Equation (10), and log-average miss rate in Equation (12) can be calculated for each feature type.

$$F1 - Score = 2 * \frac{Precision * Recall}{Precision + Recall} \quad (11)$$

The Log-average miss rate can be calculated by averaging miss rates at 9 evenly spaced FPPI points between $10^{-2}$ and 100 in log-space.

$$\text{Log} - \text{average miss rate} = \left(\prod_{i=1}^{n} a_i\right)^{\frac{1}{n}} = \exp\left[\frac{1}{n}\sum_{i=1}^{n} \ln a_i\right] \quad (12)$$

where $a_1, a_2, \ldots, a_9$ are positive values corresponding the miss rates at 9 evenly spaced FPPI points in log-space, between $10^{-2}$ and 100.

In some embodiments, a neural network for detecting and identifying features within image portions can be evaluated using 5-folds cross-validation. Table 4 shows an example evaluation using Precision (PPV-Positive Predictive Value), Recall (Sensitivity), F1-score, Log-average miss rate, and Average Precision metrics provided in Equations (4), (5), (11), (12), and (8) respectively.

TABLE 4

| Feature | Precision | Recall | F1 score | Log-average | AP@0.5 |
|---|---|---|---|---|---|
| Neutrophil | 0.84 | 0.91 | 0.87 | 0.21 | 0.90 |
| Metamyelocyte | 0.68 | 0.79 | 0.73 | 0.37 | 0.77 |
| Myelocyte | 0.80 | 0.82 | 0.81 | 0.34 | 0.80 |
| Promyelocyte | 0.60 | 0.67 | 0.64 | 0.53 | 0.62 |
| Blast | 0.87 | 0.90 | 0.88 | 0.34 | 0.84 |
| Erythroblast | 0.86 | 0.92 | 0.89 | 0.17 | 0.92 |
| Megakaryocyte | 0.80 | 0.57 | 0.67 | 0.18 | 0.60 |
| Lymphocyte | 0.73 | 0.65 | 0.69 | 0.49 | 0.66 |
| Monocyte | 0.84 | 0.71 | 0.77 | 0.36 | 0.72 |
| Plasma cell | 0.75 | 0.69 | 0.72 | 0.33 | 0.72 |
| Eosinophil | 0.93 | 0.94 | 0.93 | 0.06 | 0.97 |
| Megakaryocyte | 1.00 | 0.79 | 0.88 | 0.19 | 0.82 |
| Debris | 0.85 | 0.80 | 0.82 | 0.34 | 0.79 |
| Histiocyte | 0.90 | 0.53 | 0.67 | 0.5 | 0.54 |
| Platelet | 0.84 | 0.64 | 0.73 | 0.33 | 0.64 |
| Platelet clump | 0.93 | 0.61 | 0.73 | 0.41 | 0.62 |
| Average | 0.83 | 0.75 | 0.78 | 0.31 | mAP@0.5 = 0.75 |

As shown in the example results of Table 4, the feature types identified with least errors was for Eosinophil and Erythroblast with AP 0.97 and 0.92, respectively. Meanwhile, the feature types identified with most errors was for Megakaryocyte nucleus and Histiocyte with AP 0.60 and 0.54, respectively.

Figure 13:
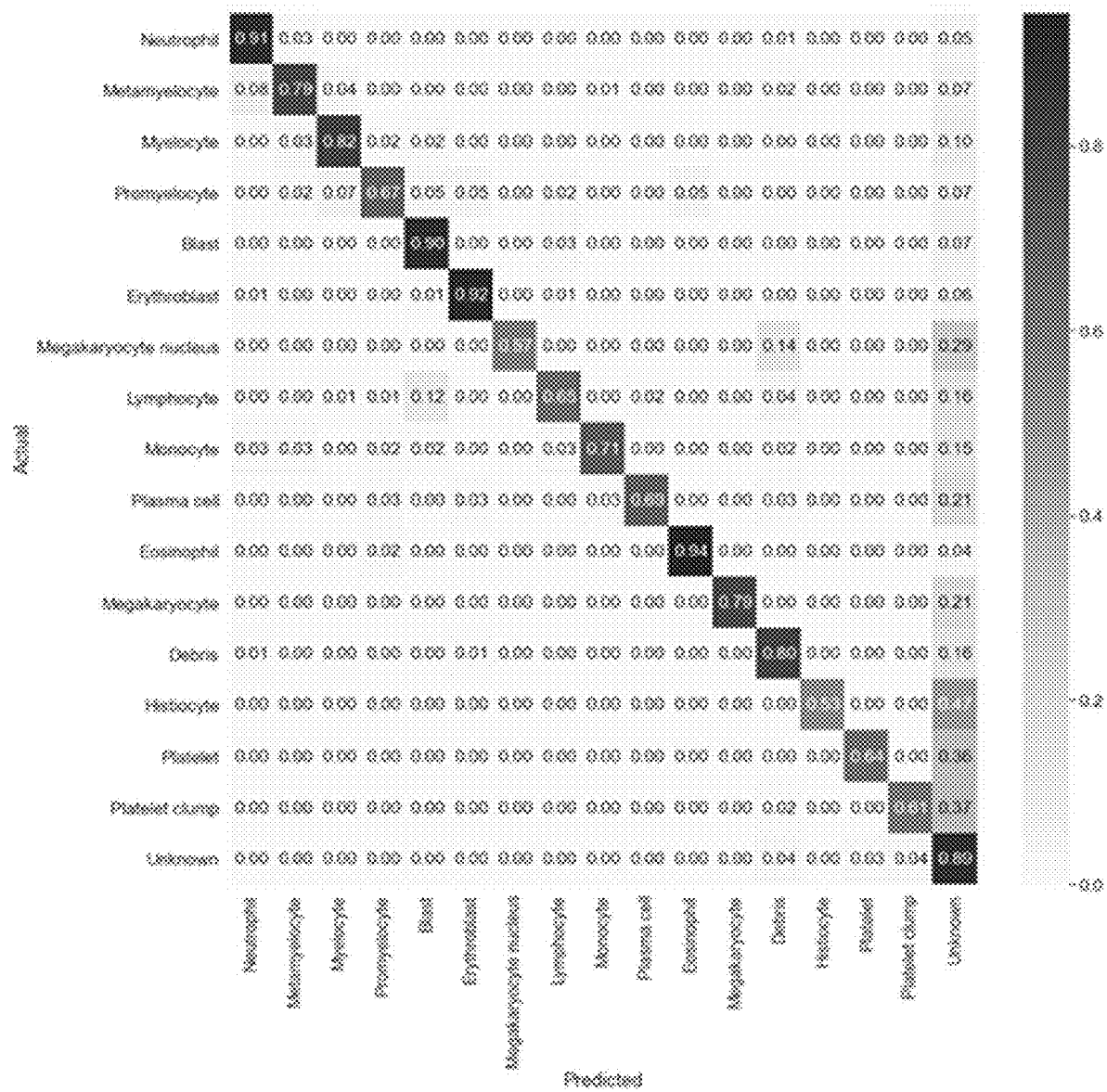
FIG. 13 shows an example cross-validation confusion matrix of results obtained from an example neural network trained for predicting features in accordance with the methods and systems disclosed herein.

In accordance with some embodiments, the neural network for detecting and identifying features within an image portion can also be evaluated by comparing the ground truths and the results obtained from the neural network. An example cross-validation confusion matrix describing misclassifications of 16 different cytological and non-cytological feature types is represented in FIG. 13. The results can be aggregated over all 5-folds cross-validation. Each value represents the percentage of classification per feature type across other feature types. Rows indicate the ground truth feature class while columns indicate the feature type predicted by the neural network. The diagonal values indicate the true positives for each object type and the off-diagonal values indicate the misclassification rates.

In some embodiments, evaluation of the neural network can involve only a subset the features that the neural network has been trained to identify. For example, Table 4 and FIG. 13 provide example results for the identification of 16 features. However, the neural network may be trained to identify a greater number of features, such as, for example, 19 features. One or more features can be omitted from evaluation. In the example of Table 4 and FIG. 13, the neural network is trained to detect and identify Basophil, Mast-cell and Other-cell features but these features were not included in the evaluation of the neural network.

In some embodiments, the neural network can be further evaluated by comparison with manually assessments performed by additional operators. Table 5 shows example results of manual assessments by two additional operators (e.g., hematopathologist 1 and hematopathologist 2). In particular, Table 5 shows the mean average precision (mAP) of the manual assessments based on the Average Precision for each of the different object classes.

TABLE 5

| Feature | AP@0.5 Hematopathologist 1 | AP@0.5 Hematopathologist 2 |
|---|---|---|
| Neutrophil | 0.95 | 0.95 |
| Metamyelocyte | 0.90 | 0.87 |
| Myelocyte | 0.90 | 0.90 |
| Promyelocyte | 0.90 | 0.90 |
| Blast | 0.92 | 0.92 |
| Erythroblast | 0.95 | 0.95 |
| Megakaryocyte nucleus | 0.75 | 0.80 |
| Lymphocyte | 0.85 | 0.85 |
| Monocyte | 0.92 | 0.95 |
| Plasma cell | 0.85 | 0.85 |
| Eosinophil | 0.99 | 0.99 |
| Megakaryocyte | 0.95 | 0.95 |
| Debris | 0.90 | 0.95 |
| Histiocyte | 0.80 | 0.80 |
| Platelet | 0.92 | 0.92 |
| Platelet clump | 0.90 | 0.95 |
| Average | mAP@0.5 = 0.90 | mAP@0.5 = 0.91 |

An example system implementing method 200 can have an architecture that includes two neural networks: a first neural network for identifying relevant image portions and a second neural network for detecting and identifying feature within relevant image portions. In some embodiments, the time for the first neural network to identify relevant image portions having a size of about 512×512 pixels can be about 30 milliseconds. As a result, the total time for an example system to obtain a digital whole slide image from storage, divide the whole slide image into a plurality of image portions, and identify relevant image portions from the plurality of image portions can be about four minutes. The time for the second neural network to detect and identify features within a relevant image portion having a size of about 512×512 pixels can be about 50 milliseconds. Since the similarity threshold hold can be satisfied after approximately 400 to 500 image portions, the total time for the example system to implement method 200 can be about five minutes.

Bone marrow studies can also involve analyzing both—a cytology specimen and a histopathology specimen of a patient—to make a hematological diagnosis. That is, analysis of the cytology specimen and analysis of the histopathology specimen can be used together to generate a hematological disease classification.

Figure 14:
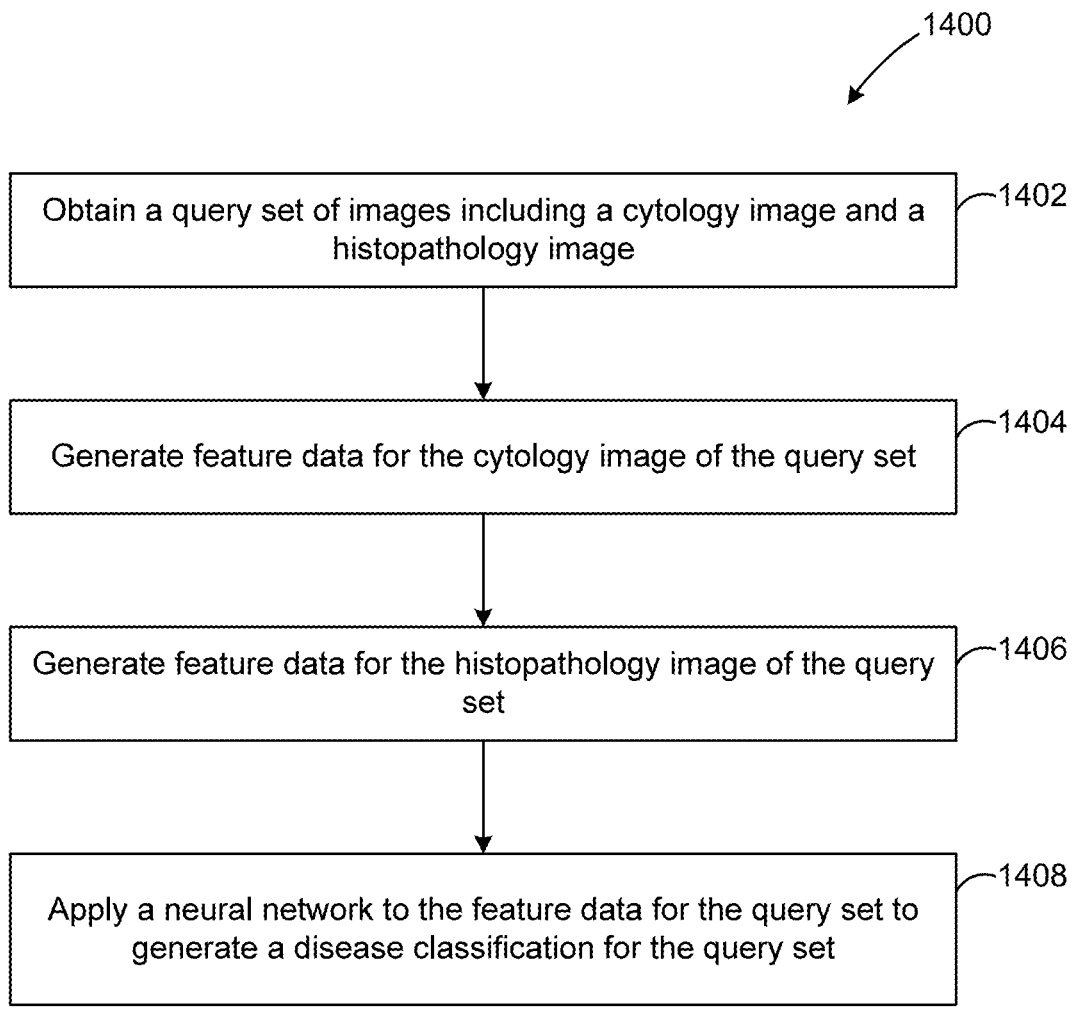
FIG. 14 is a flowchart of an example method for generating a hematological disease classification.

Reference now is made to FIG. 14, which illustrates an example method 1400 for generating a hematological disease classification. A medical image diagnostic system, such as medical image diagnostic system 110 having a processor 112 can be configured to implement method 1400.

At 1402, the processor 112 can obtain a query set of images for a patient. The query set of images can include at least a cytology image and a histopathology image. The cytology image can be a whole slide image for a cytology specimen, such as a blood film or a bone marrow aspirate specimen. The histopathology image can be a whole slide image for a histopathology specimen, such as a trephine core biopsy (i.e., solid tissue histopathology specimen). The query set of images can be retrieved from a data storage component, such as data storage component 116 or external data storage 130.

At 1404, the processor 112 can generate feature data for the cytology image of the query set. In some embodiments, feature data can be generated by applying the example method 200 to the cytology image. That is, the feature data for the cytology image can be the base cell data of the cytology image when the similarity threshold is satisfied at 214.

At 1406, the processor 112 can generate feature data for the histopathology image of the query set. In some embodiments, feature data for the histopathology image can be generated by implementing the example method 200 to the histopathology image. That is, the feature data can be the base cell data of the histopathology image when the similarity threshold is satisfied at 214.

In some embodiments, the neural network trained to identify relevant image portions of the cytology image can be the same neural network trained to identify relevant image portions of the histopathology image. In other embodiments, the neural network trained to identify relevant image portions of the cytology image can be a different neural network trained to identify relevant image portions of the histopathology image.

In some embodiments, the neural network trained to detect and identify features contained in relevant image portions of the cytology image can be the same neural network trained to detect and identify features contained in relevant image portions of the histopathology image. In other embodiments, the neural network trained to detect and identify features contained in relevant image portions of the cytology image can be a different neural network trained to detect and identify features contained in relevant image portions of the histopathology image.

Although FIG. 14 shows the step of generating feature data for the cytology image 1404 before the step of generating feature data for the histopathology image 1406, steps 1404 and 1406 are generally independent and can be performed in parallel or in any sequential order.

At 1408, the processor 112 can apply a neural network to the feature data for the query set to generate a disease classification for the query set. That is, the processor 112 can apply a neural network to the feature data for cytology image and the feature data for the histopathology image. In some embodiments, the processor 112 can concatenate the feature data for the cytology image and the feature data for the histopathology image prior to applying the neural network to generate a disease classification.

Figure 15:
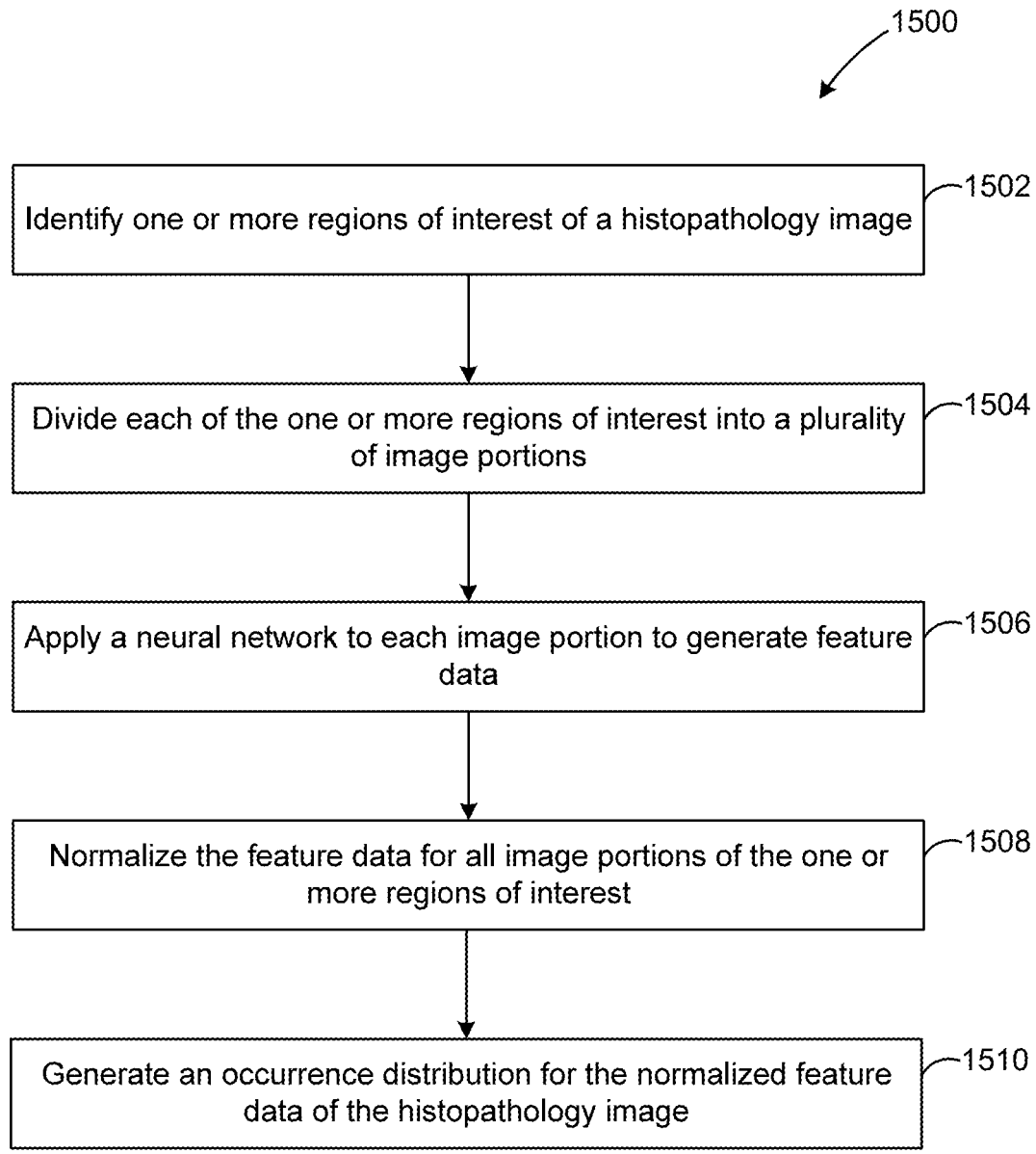
FIG. 15 is a flowchart of an example method for generating feature data for a histopathology image.
Figure 16A:
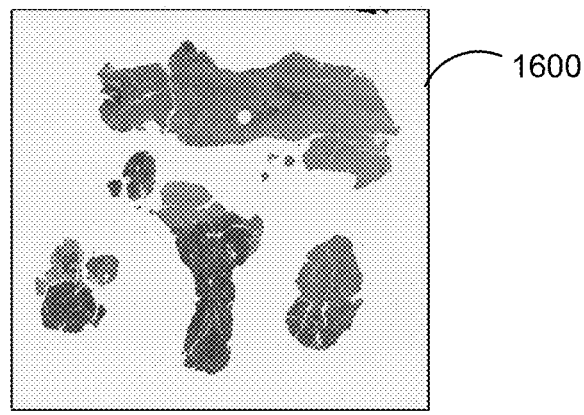
FIG. 16A shows an example image of a histopathology specimen.

In some embodiments, the processor 112 may not generate feature data for the histopathology image using example method 200. Instead, the processor 112 may implement another method for generating feature data for a histopathology specimen, such as example method 1500 of FIG. 15. A medical image diagnostic system, such as medical image diagnostic system 110 having a processor 112 can be configured to implement method 1500. To assist with the description of the method 1500 shown in FIG. 15, reference will be made simultaneously to FIG. 16A to FIG. 16C. An example histopathology image 1600 of a histopathology specimen is shown in FIG. 16A.

Figure 16B:
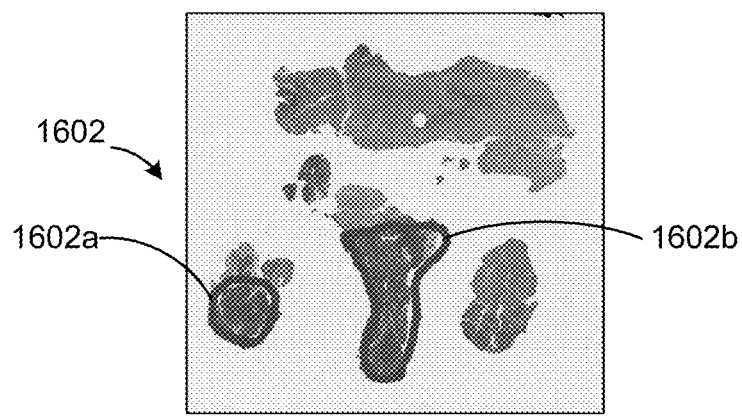
FIG. 16B shows the image of FIG. 16A annotated with regions of interest as identified by the methods and systems disclosed herein.

At 1502, the processor 112 can identify one or more regions of interest of the histopathology image 1600. FIG. 16B shows example regions of interest 1602a, 1602b (collectively referred to as 1602) identified in the histopathology image 1600. In some embodiments, the processor 112 can apply a neural network to detect the one or more regions of interest 1602 of the histopathology image 1600. In some embodiments, such a neural network can localize features and generate a boundary, such as a bounding box, for the detected feature.

Figure 16C:
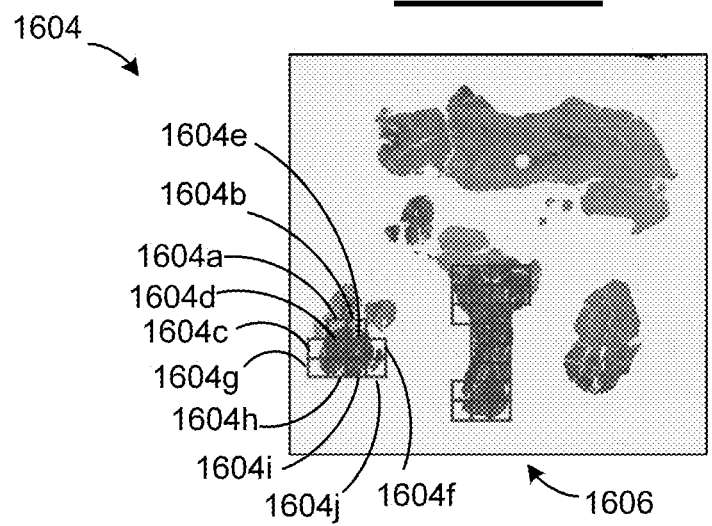
FIG. 16C shows the regions of interest of FIG. 16B divided into image portions in accordance with the methods and systems disclosed herein.

At 1504, the processor 112 can divide each of the one or more regions of interest 1602 into a plurality of image portions. As shown in the example of FIG. 16C, the processor 112 can generate a grid that generally covers region of interest 1602a of the histopathology image 1600 and divides the region of interest 1602a into a plurality of substantially equal sized image portions 1604a, 1604b, 1604c, 1604d, 1604e, 1604f, 1604g, 1604h, 1604i, 1604j (collectively referred to as image portions 1604). Similarly, the processor can generate a grid that generally covers region of interest 1602b and divides region of interest 1602b into a plurality of image portions 1606.

The image portions 1604, 1606 can also be called image tiles or patches. In some embodiments, the processor 112 can divide each of the regions of interest 1602 into larger or smaller image portions than that shown in FIG. 16C. In some embodiments, one or more image portions of the plurality of image portions can be shaped differently. In some embodiments, one or more image portions of the plurality of image portions can be sized differently. In some embodiments, one or more image portions of the plurality of image portions can overlap.

At 1506, the processor 112 can apply a neural network to each image portion to generate feature data representative of image characteristics of the image portion. That is, the processor 112 can apply a neural network to each image portion to extract deep features representative of image characteristics of that image portion. In some embodiments, the feature data can be a feature vector, such as a vector with real value numbers. For example, each real value number be representative of the likelihood of a feature type detected in that image portion.

At 1508, the processor 112 can normalize the feature data of each image portion. For example, a normalized feature vector for each image portion can be generated such that normalized feature vectors have the same format for all image portions of the histopathology image. For example, a particular feature type may be predicted in a first image portion but not a second image portion. Accordingly, the feature vector for the second image portion may not include feature data for that particular feature type. The normalized feature vector for the second image portion can include feature data (e.g., value of zero) for that particular feature type.

At 1510, the processor 112 can generate an occurrence distribution for the normalized feature data of the histopathology image. In some embodiments, the processor 112 can combine feature vectors from all image portions to generate the occurrence distribution. In some embodiments, the processor 112 can generate a histogram to represent the normalized feature data of all image portions of the histopathology image. The histogram of the normalized feature data can be representative of the accuracy likelihood distribution of feature types detected in the histopathology image. The occurrence distribution generated at 1510 can be used in as the feature data for the histopathology image at 1406 of method 1400.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

The invention claimed is:

1. A method of improving a feature identification process for a cytology specimen, the method comprising:
dividing a digital whole slide image of the cytology specimen into a plurality of image portions;
evaluating each image portion of the plurality of image portions with a feature detection neural network trained to identify one or more relevant image portions from the plurality of image portions that contain a region of interest for the cytology specimen, whereby reducing a number of image portions from being further processed when absent the region of interest for the cytology specimen;
automatically selecting a base set of relevant image portions from the one or more relevant image portions, the base set of relevant image portions containing an initial set of relevant image portions for identifying features for the cytology specimen;
evaluating the base set of relevant image portions with a feature identification neural network trained to generate a base cell data comprising a predicted feature type for each feature identified within that image portion and an accuracy likelihood associated with the predicted feature type;
evaluating one or more relevant image portions outside the base set of relevant image portions with the feature identification neural network to generate a supplemental cell data comprising the predicted feature type for each feature within the one or more relevant image portions and the associated accuracy likelihood for the predicted feature type;
determining whether the supplemental cell data and the base cell data satisfy a similarity threshold indicative that the base cell data is sufficiently representative of features present in the cytology specimen;
in response to determining the similarity threshold is not satisfied:
updating the base set to include the supplemental cell data, and generating the updated base cell data with the updated base set with the feature identification neural network; and
continuing to apply the feature identification neural network to another one or more relevant image portions to generate the supplemental cell data, and determining whether the supplemental cell data and the updated base cell data satisfy the similarity threshold until the similarity threshold is satisfied; and
otherwise, providing the feature types portion identified for the cytology specimen.

2. The method of claim 1, wherein determining whether the supplemental cell data and the base cell data satisfy the similarity threshold comprises:
applying a statistical model to the supplemental cell data and the base cell data to determine whether the similarity threshold is satisfied.

3. The method of claim 2, wherein applying the statistical model comprises:
determining a chi-square distance between the supplemental cell data and the base cell data.

4. The method of claim 1 further comprises generating a histogram to represent each cell data.

5. The method of claim 1, wherein the predicted feature type comprises a predicted cell type.

6. The method of claim 1, wherein the predicted feature type comprises a predicted non-cellular type.

7. The method of claim 1, wherein the feature detection neural network is trained to identify the regions of interest suitable for identifying features of the cytology specimen.

8. The method of claim 1, wherein the feature identification neural network is trained to detect and identify the features within the cytology specimen.

9. A system for improving a feature identification process for a cytology specimen, the system comprising a processor operable to:
divide a digital whole slide image of the cytology specimen into a plurality of image portions;
evaluate each image portion of the plurality of image portions with a feature detection neural network trained to identify one or more relevant image portions from the plurality of image portions that contain a region of interest for the cytology specimen, whereby reducing a number of image portions from being further processed when absent the region of interest for the cytology specimen;
automatically select a base set of relevant image portions from the one or more relevant image portions, the base set of relevant image portions containing an initial set of relevant image portions for identifying features for the cytology specimen;

evaluate the base set of relevant image portions with a feature identification neural network trained to generate a base cell data comprising a predicted feature type for each feature identified within that image portion and an accuracy likelihood associated with the predicted feature type;

evaluate one or more relevant image portions outside the base set of relevant image portions with the feature identification neural network to generate a supplemental cell data comprising the predicted feature type for each feature within the one or more relevant image portions and the associated accuracy likelihood for the predicted feature type;

determine whether the supplemental cell data and the base cell data satisfy a similarity threshold indicative that the base cell data is sufficiently representative of features present in the cytology specimen;

in response to determining the similarity threshold is not satisfied:
update the base set to include supplemental cell data, and generate the updated base cell data with the updated base set with the feature identification neural network; and
continue to apply the feature identification neural network to another one or more relevant image portions to generate the supplemental cell data, and determine whether the supplemental cell data and the updated base cell data satisfy the similarity threshold until the similarity threshold is satisfied; and otherwise, provide the feature types identified for the cytology specimen.

10. The system of claim 9, wherein the processor is operable to:
apply a statistical model to the supplemental cell data and the base cell data to determine whether the similarity threshold is satisfied.

11. The system of claim 10, wherein the processor is operable to determine a chi-square distance between the supplemental cell data and the base cell data.

12. The system of claim 9, wherein the processor is operable to generate a histogram to represent each cell data.

13. The system of claim 9, wherein the predicted feature type comprises a predicted cell type.

14. The system of claim 9, wherein the predicted feature type comprises a predicted non-cellular type.

15. The system of claim 9, wherein the first feature detection neural network is trained to identify the regions of interest suitable for identifying features of the cytology specimen.

16. The system of claim 9, wherein the feature identification neural network is trained to detect and identify the features within the cytology specimen.

17. A method of improving a feature identification process for a cytology specimen, the method comprising:
dividing a digital whole slide image of the cytology specimen into a plurality of image portions;
evaluating each image portion of the plurality of image portions with a feature detection neural network trained to identify one or more relevant image portions from the plurality of image portions that contain a region of interest for the cytology specimen, whereby reducing a number of image portions from being further processed when absent the region of interest for the cytology specimen;
evaluating a first relevant image portion and a second relevant image portion with a feature identification neural network trained to generate a respective first and second cell data comprising a predicted feature type for each feature identified within that image portion and an accuracy likelihood associated with the predicted feature type;
determining whether the first cell data and the second cell data satisfy a similarity threshold indicative that the cell data is sufficiently representative of features present in the cytology specimen;
in response to determining the similarity threshold is not satisfied:
updating the first cell data to include the second cell data;
continuing to apply the feature identification neural network to a subsequent relevant image portion of the one or more relevant image portions until the similarity threshold is satisfied; and
otherwise, providing the feature types identified for the cytology specimen.

18. The method of claim 17, wherein determining whether the first cell data and the second cell data satisfy the similarity threshold comprises:
applying a statistical model to the first cell data and the second cell data to determine whether the similarity threshold is satisfied.

19. The method of claim 18, wherein applying the statistical model comprises determining a chi-square distance between the first cell data and the second cell data.

20. A system for improving a feature identified process for a cytology specimen, the system comprising a processor operable to:
divide a digital whole slide image of the cytology specimen into a plurality of image portions;
evaluate each image portion of the plurality of image portions with a feature detection neural network trained to identify one or more relevant image portions from the plurality of image portions that contain a region of interest for the cytology specimen, whereby reducing a number of image portions from being further processed when absent the region of interest for the cytology specimen;
evaluate a first relevant image portion and a second relevant image portion with a feature identification neural network trained to generate a respective first and second cell data comprising a predicted feature type for each feature identified within that image portion and an accuracy likelihood for associated with the predicted feature type;
determine whether the first cell data and the second cell data satisfy a similarity threshold indicative that the cell data is sufficiently representative of features present in the cytology specimen;
in response to determining the similarity threshold is not satisfied:
update the first cell data to include the second cell data;
continue to apply the feature identification neural network to a subsequent relevant image portion of the one or more relevant image portions until the similarity threshold is met; and
otherwise, provide the feature types identified for the cytology specimen.

21. The system of claim 20, wherein the processor is operable to apply a statistical model to the first cell data and the second cell data to determine whether the similarity threshold is satisfied.

22. The system of claim 21, wherein the processor is operable to determine a chi-quare distance between the first cell data and the second cell data.

\* \* \* \* \*